US011300258B2

(12) United States Patent
McDonald et al.

(10) Patent No.: US 11,300,258 B2
(45) Date of Patent: **\*Apr. 12, 2022**

(54) ROTATIONALLY ADJUSTABLE OUTDOOR SECURITY LIGHT

(71) Applicant: HeathCo LLC, Bowling Green, KY (US)

(72) Inventors: Miles William McDonald, Bowling Green, KY (US); Apollo Paul Paredes, Livonia, MI (US); Kushagra Dixit, Bowling Green, KY (US); Lionel V. Luu, Bowling Green, KY (US); Scott Blaise Tylicki, Bowling Green, KY (US); John Colvin Deaton, Bowling Green, KY (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,004

(22) Filed: Mar. 24, 2021

(65) Prior Publication Data

US 2022/0082218 A1 Mar. 17, 2022

Related U.S. Application Data

(60) Provisional application No. 63/077,848, filed on Sep. 14, 2020.

(51) Int. Cl.
*F21S 8/00* (2006.01)
*F21V 21/30* (2006.01)
*F21V 23/04* (2006.01)

(52) U.S. Cl.
CPC .............. *F21S 8/003* (2013.01); *F21V 21/30* (2013.01); *F21V 23/0471* (2013.01)

(58) Field of Classification Search
CPC ....... F21V 23/0471; F21V 21/30; F21S 8/003
See application file for complete search history.

(56) References Cited

U.S. PATENT DOCUMENTS

| 2,032,018 | A | 2/1936 | Holmes |
| 2,199,905 | A | 5/1940 | Arras |

(Continued)

FOREIGN PATENT DOCUMENTS

| CA | 2950554 A1 | 6/2018 |
| CN | 203517653 U | 4/2014 |

(Continued)

OTHER PUBLICATIONS

IQ America,180-Degree Bronze Motion Activated Outdoor Integrated LED Flood Light with 1500 Lumens, Retrieved from: https://www.homedepot.com/p/IQ-America-180-Degree-Bronze-Motion-Activated-Outdoor-Integrated-LED-Flood-Light-with-1500-Lumens-LM-1801-BZ/301302474, Retrieved on May 21, 2021.

(Continued)

*Primary Examiner* — Thomas M Sember
(74) *Attorney, Agent, or Firm* — Middleton Reutlinger

(57) ABSTRACT

The present disclosure sets forth an outdoor security light with the flexibility of being mounted to either a wall structure or to an eave or ceiling structure. The security light can be adjusted for each installation without the necessity of changing hardware elements of the security luminaire. Various embodiments allow for both a vertical installation wall mount, and a horizontal installation ceiling or eave mount, while maintaining appropriate outward orientation of the lamp heads while also allowing for appropriate positioning of a motion or other sensors.

21 Claims, 10 Drawing Sheets

(56) References Cited

U.S. PATENT DOCUMENTS

| | | | |
|---|---|---|---|
| 2,984,738 A | 5/1961 | Belau | |
| 4,240,999 A | 12/1980 | Decker et al. | |
| 4,464,707 A | 8/1984 | Forrest | |
| 5,107,120 A | 4/1992 | Tom | |
| 5,148,158 A | 9/1992 | Shah | |
| 5,258,899 A | 11/1993 | Chen | |
| 5,649,761 A | 7/1997 | Sandell et al. | |
| 5,677,529 A | 10/1997 | Hofmann et al. | |
| 6,082,878 A | 7/2000 | Doubek et al. | |
| 6,100,803 A | 8/2000 | Chang | |
| 6,175,309 B1 | 1/2001 | Drake | |
| 6,217,340 B1 | 4/2001 | Gordon | |
| 6,764,197 B1 | 7/2004 | Zemar | |
| 6,781,129 B2 | 8/2004 | Leen | |
| 6,793,499 B1 | 9/2004 | Chen | |
| 6,844,555 B2 | 1/2005 | Beasley | |
| D515,226 S | 2/2006 | Beasley | |
| 7,052,171 B1 | 5/2006 | Lefebvre et al. | |
| 7,375,313 B2 | 5/2008 | Lee | |
| 7,473,899 B2 | 1/2009 | Chi et al. | |
| 7,543,958 B2 | 6/2009 | Chi et al. | |
| 7,635,846 B2 | 12/2009 | Chi et al. | |
| 7,641,366 B1 * | 1/2010 | Sibalich | F21V 23/0442 362/371 |
| 7,654,705 B2 | 2/2010 | Czech et al. | |
| 7,740,499 B1 | 6/2010 | Willey et al. | |
| 8,348,215 B1 | 1/2013 | Smith | |
| 8,461,991 B2 | 6/2013 | Botha | |
| 8,608,502 B2 | 12/2013 | Witter et al. | |
| 9,188,320 B2 | 11/2015 | Russello et al. | |
| 9,243,786 B1 | 1/2016 | Onda et al. | |
| 9,595,794 B2 | 3/2017 | Birdwell et al. | |
| 9,839,088 B1 | 12/2017 | Deaton | |
| 9,920,912 B1 | 3/2018 | Zhang et al. | |
| 9,970,611 B2 | 5/2018 | Toner | |
| 10,107,480 B1 | 10/2018 | Ladewig et al. | |
| D869,721 S | 12/2019 | Recker et al. | |
| 10,533,736 B2 | 1/2020 | Chen | |
| 10,718,500 B1 | 7/2020 | Tylicki et al. | |
| 10,788,194 B2 | 9/2020 | Stevens et al. | |
| 2004/0090781 A1 | 5/2004 | Yeoh | |
| 2008/0239709 A1 | 10/2008 | Rapeanu et al. | |
| 2010/0259383 A1 | 10/2010 | Botha | |
| 2014/0103214 A1 | 4/2014 | Messiou et al. | |
| 2015/0092408 A1 | 4/2015 | Wallach | |
| 2015/0330587 A1 | 11/2015 | Lax et al. | |
| 2016/0003461 A1 | 1/2016 | Chen | |
| 2016/0131346 A1 | 5/2016 | Creasman et al. | |
| 2016/0369991 A1 | 12/2016 | Lim | |
| 2018/0195703 A1 | 7/2018 | Bailey et al. | |
| 2019/0113220 A1 | 4/2019 | Haase et al. | |
| 2019/0211985 A1 | 7/2019 | Wijaya et al. | |

FOREIGN PATENT DOCUMENTS

| | | |
|---|---|---|
| CN | 203771112 U | 8/2014 |
| CN | 203771209 U | 8/2014 |
| CN | 203771272 U | 8/2014 |
| CN | 203771279 U | 8/2014 |
| CN | 203773612 U | 8/2014 |
| CN | 203868804 U | 10/2014 |
| EP | 1365370 A1 | 11/2003 |
| EP | 1727104 A1 | 11/2006 |
| EP | 2577243 B1 | 2/2015 |
| JP | 4518268 B2 | 8/2010 |
| WO | WO2008093163 A2 | 8/2008 |
| WO | WO2012056268 A1 | 5/2012 |
| WO | WO2012056269 A1 | 5/2012 |
| WO | WO2012056270 A1 | 5/2012 |
| WO | WO2012093291 A1 | 7/2012 |
| WO | WO2014021706 A1 | 2/2014 |
| WO | WO2015047078 A1 | 4/2015 |
| WO | WO2016209068 A2 | 12/2016 |
| WO | WO2016209069 A1 | 12/2016 |
| WO | WO2017007299 A1 | 1/2017 |

OTHER PUBLICATIONS

IQ America, 180-Degree White Motion Activated Outdoor Integrated LED Twin Flood Lights with 1500 Lumens, Retrieved from: https://www.homedepot.com/p/IQ-America-180-Degree-White-Motion-Activated-Outdoor-Integrated-LED-Twin-Flood-Lights-with-1500-Lumens-LM-1802-WH/301304226, Retrieved on May 21, 2021.

IQ America, 1801 Motion Sensor LED Lights, IQ America Instruction Manual, dated Jan. 5, 2016.

IQ America, Instruction Manual, Promotional LED Motion Sensor Light, LP1803, Jan. 27, 2016.

IQ America, Instruction Manual, Motion Sensor LED Lights, LM-1802, Jan. 5, 2016.

Halo, Instruction Manual, Eaton, Retrieved from https://images.homedepot-static.com/catalog/pdfImages/36/36eb2571-b44b-4c59-83c6-9c06541ebd54.pdf, Retrieved on Mar. 27, 2020.

* cited by examiner

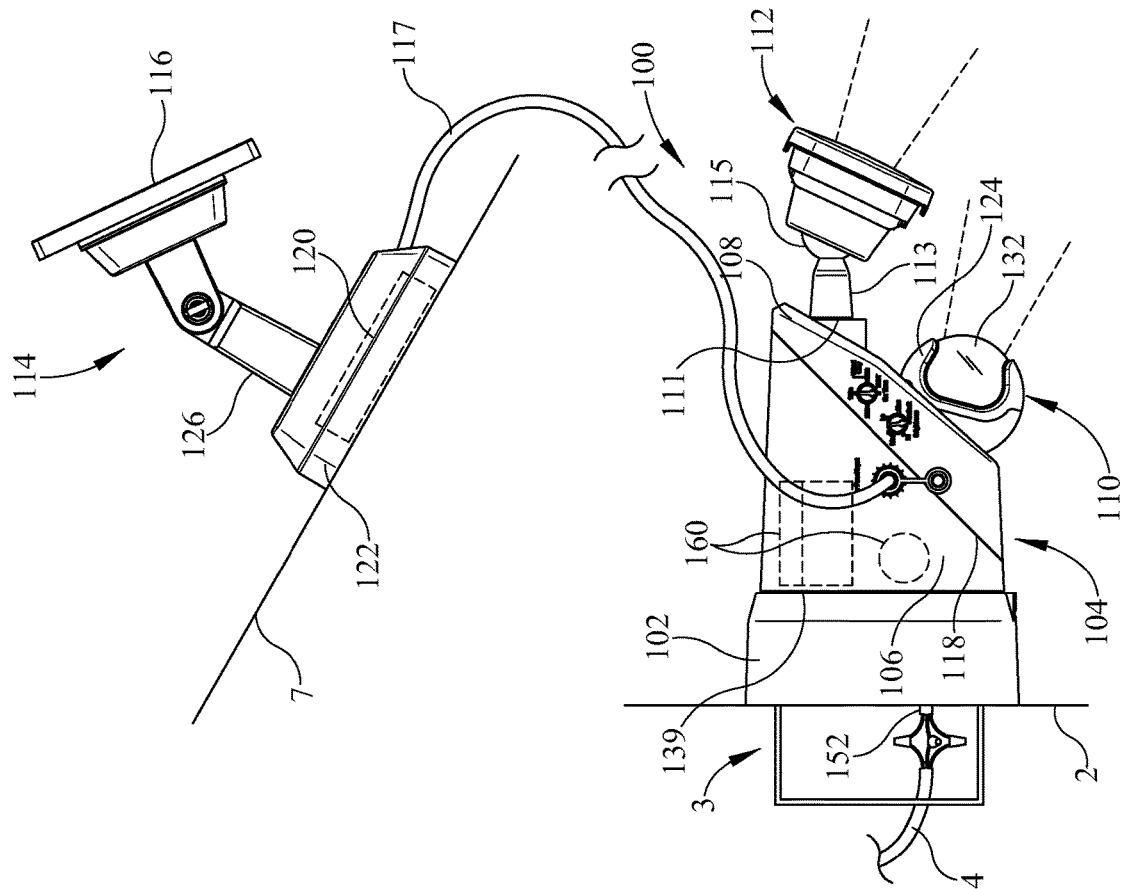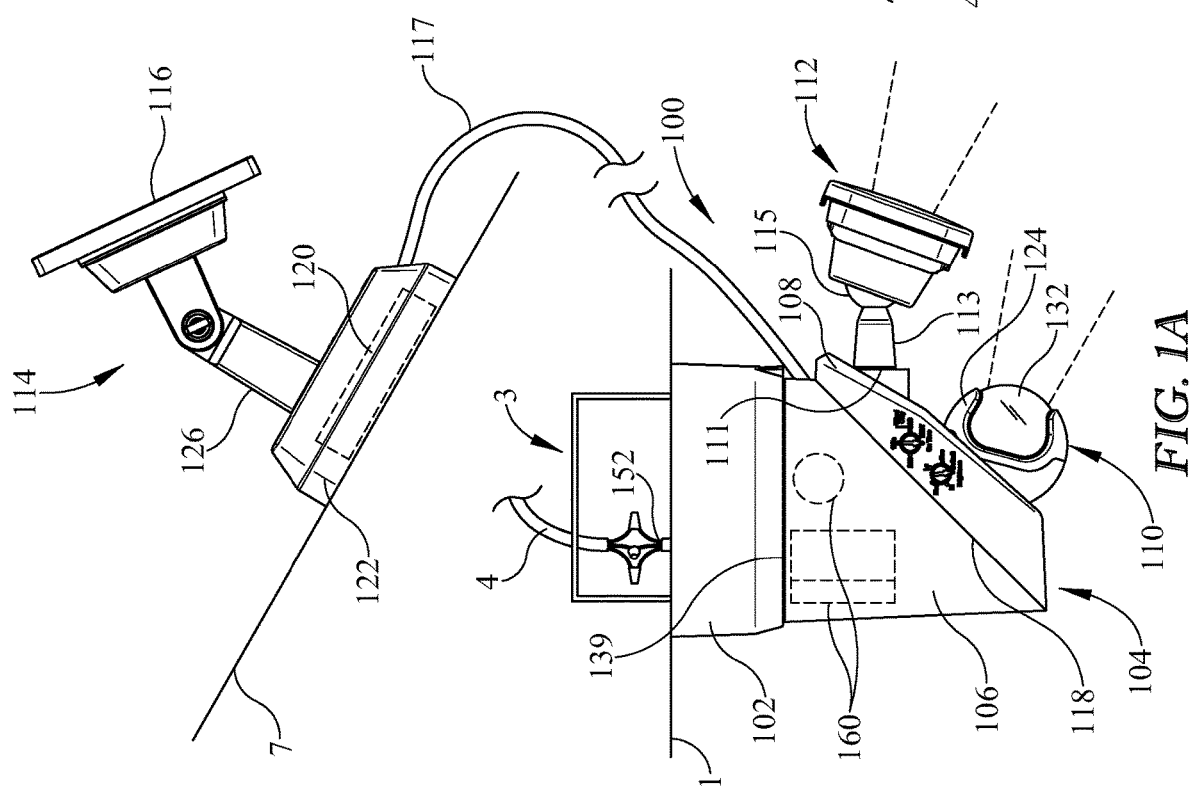

ROTATIONALLY ADJUSTABLE OUTDOOR SECURITY LIGHT

BACKGROUND

Motion based security lighting typically includes a luminaire housing which is fixed to a junction box or wall. Such construction prevents variability in proper installation of the standard security light construction.

SUMMARY

The present disclosure is directed generally to an outdoor security light which can be installed in variable orientations. Installation variability allows the security light to be installed underneath an eave or on a vertical wall. Structural modifications allow the security light to be installed separately form the mounting portion and also provides rotational capability between two portions of the luminaire housing. Separating the mounting structure from the security light housing eases installation and allows low voltage direct connection between the security light housing and the mounting structure. Further, the security light housing can be rotated relative to two portions of the housing so that the luminaire body can be re-oriented appropriately depending on whether it is installed under an eave or a vertical wall. Reorientation allows the lamp heads to be directed outwardly while preventing the sensors from being obstructed. Such reorientation also allows the detection sensors to have an unobstructed field of view separate from the lamp heads.

The present disclosure sets forth an outdoor security light with the flexibility of being mounted to either a wall structure or to an eave or ceiling structure. The security light can be adjusted for each installation without the necessity of changing hardware elements of the security luminaire. Various embodiments allow for both a vertical installation wall mount, and a horizontal installation ceiling or eave mount, while maintaining appropriate outward orientation of the lamp heads while also allowing for appropriate positioning of a motion or other sensors.

Multiple issues necessarily come into consideration when mounting a security light to a wall or other ceiling structure, which make providing a luminaire housing difficult. For example, in a wall mount installation, the lamp heads of the security light typically rise vertically above the mounting position and are clear of any obstruction. Further, in many instances, the motion sensor is appropriately positioned facing outward from the wall providing a further unobstructed view of the detection field. Such structural positioning may be reasonably achieved with standard housing assemblies. In other installations however, such as with an eaves mount, rotating or modifying the position of the lamp heads outward and away into the field of illumination may prove difficult due to the eaves or ceiling. In other words, fully rotating the lamp heads so they directly illuminate outward may not be possible due to the ceiling or eaves preventing upward rotation of the lamp heads. Similarly, the luminaire housing, now facing downward in such installation, also improperly positions the motion sensors which must then be readjusted outward into the detection field. An unobstructed view of the entire detection field where the lamp heads are directed may not be available due to the lamp heads or other portions of the luminaire housing. Such repositioning may also be prevented due to limitations of the housing construction.

By providing a separate wall mount affixable to the wall or ceiling/eaves structure without the main luminaire housing improves ease of luminaire installation while also increasing variability of installation location. Additionally, connection of electrical lines at the junction box are more readily available and attached when only installing the related housing mount type structure and not the entire security light. Further, providing electrical modification within the housing mount and separate from the main luminaire further ease of installation by providing direct connect low voltage electrical contacts between the luminaire housing and the housing mount.

Consistent with various aspects of the present disclosure, a luminaire housing is provided which is a rotationally adjustable outdoor security light for wall or eaves mounting to resolve such issues. In various installations and embodiments, the outdoor security light includes a separate housing mount which attaches directly to the structure mounting surface. In some embodiments, the housing mount can attach directly to the junction box interface and receive the electrical wiring retained within the junction box. In variations, the housing mount can attach directly to a standard line voltage power line AC current which may provide standard 110-120 VAC per phase at 60 Hz, 100 amps per phase connection.

In some of these embodiments, the housing mount may include internal electronics to modify the electricity received from the standard line voltage power line to provide low voltage DC to the luminaire and the associated electronics.

In variations, some embodiments may include multiple electrical contacts to convey the modified electricity directly to the luminaire housing. For example, in some examples, the housing mount may include electrical contacts which can be electrically engaged by the luminaire housing and which modify the line voltage and current to a required low voltage DC.

In other embodiments, a security light luminaire housing may also be provided which has a first portion and a second portion wherein the first portion removably attaches directly to the housing mount. The housing mount may have a locking mechanism to restrain or attach the luminaire housing thereto.

In some further embodiments, the luminaire housing second portion is provided with at least one luminaire lamp head, the at least one lamp head having a plurality of LEDs and being affixed to the second portion. The at least one lamp head may be adjustable relative to the second portion of the luminaire housing. Additionally, the second portion of the luminaire housing may further have a motion sensor which itself may be adjustable in order to modify its field of detection.

To implement modification and adjustability of the security light for mounting on a wall or eaves orientation, the second portion of the luminaire housing may be rotationally attached to the first portion of the luminaire housing. In some of these embodiments the second portion of the luminaire housing may rotate about 180 degrees relative to the first portion of the luminaire housing.

Embodiments set forth herein include a rotationally adjustable outdoor security light for wall or eaves mount. The security light includes a housing mount affixable to a surface of a structure and a luminaire housing. The luminaire housing can include a luminaire housing first portion removably attachable to the housing mount and a luminaire housing second portion rotatable relative to the first portion. The luminaire housing second portion in embodiments can have a motion sensor and at least one lamp head. For example, one or more lamp heads with a plurality of LEDs can be implemented to emit light on the security light.

One or more of the following may be optionally included with the security light. In some embodiments, the security light has a luminaire housing first portion which is rotatable relative to the housing mount. For example, in embodiments, the housing mount may have a receiving collar removably receiving the luminaire housing first portion. In still further embodiments, the collar may include a locking mechanism restraining the luminaire housing first portion in the receiving collar.

In various embodiments, to promote mounting variability, the luminaire housing second portion rotates along an angled rotational surface of the luminaire housing first portion. For example, the angled rotational surface can be angled relative to a mounting plane formed on the rear mounting surface of the luminaire housing first portion. In some embodiments, this angled rotational surface between the first portion and the second portion may be greater than 45 degrees relative to such mounting plane. In other embodiments, the angled surface may be about 50 degrees.

In some variations, the security light set forth herein has a luminaire housing first portion is electrically connected to the housing mount. In some of such embodiments, the luminaire housing first portion has at least one electrical contact rotationally engaging at least one electrical contact on the housing mount. For example, the mounting housing mounting plate can have a first and a second arcuate rotationally extending electrical connecting surface.

In still further embodiments, the security light set forth can have at least one lamp head which includes a first and a second lamp head each rotationally attached to the luminaire second portion by a respective first and second rotational hinge. In some such embodiments, each respective rotational hinge rotates about a first and a second axis. In even further embodiments, the first and second axis are orthogonal.

In some embodiments, the security light set forth herein may include a motion sensor which is mounted on the luminaire housing second portion independent of the at least one lamp head. For example, the motion sensor may be separately mounted below the lamp head in both a wall or ceiling mount installation on a lower portion of the front facing luminaire surface. In some such further variations, the motion sensor may include an adjustable sensor shroud. In variations, the adjustable sensor shroud adjustably covers a lens of the motion sensor.

In still further variations, the security light set forth herein may include a receiving collar of the housing mount wherein the receiving collar surrounds a housing mount receiving plate. In such embodiments, optionally the housing mount receiving plate may have a first and a second rotational electrical contact. In still further optional embodiments, the first and the second rotational electrical contacts of the housing mount receiving plate are a first and a second concentric electrical contact ring. In even further embodiments, the luminaire housing first portion has a first and a second rearwardly projecting electrical contact aligned with the first and the second rotational electrical contact of the housing mount receiving plate.

In still further embodiments, the security light described herein may have a luminaire housing second portion is rotatable relative to the luminaire housing first portion at least 180 degrees to enable appropriate installation variability.

In some embodiments of the present disclosure include a rotationally adjustable outdoor security light for wall or eaves mount which includes a housing mount removably receiving a luminaire housing. The luminaire housing may include a luminaire housing first portion and a luminaire housing second portion, the luminaire housing first portion removably attached to the housing mount. In such embodiments, the luminaire housing in electrical contact with the housing mount while the luminaire housing second portion is rotational relative to the luminaire housing first portion. In such embodiments, the luminaire housing may have at least one lamp head adjustably mounted to the luminaire housing and also having an adjustable sensor.

In still further embodiments, a rotationally adjustable outdoor security light for wall or eaves mount is provided having a housing mount affixable to a wall or an eaves, the housing mount having a plurality of rotationally engageable electrical contacts. The luminaire housing may be removably attached to the housing mount, the luminaire housing having a plurality of luminaire electrical contacts respectively engaging the plurality of rotationally engageable electrical contacts of the housing mount. In some such embodiments, the luminaire housing may have a first portion and a second portion, the luminaire housing second portion rotationally connected to the luminaire housing first portion and rotatable by about 180 degrees on the luminaire housing first portion. In some of these embodiments, the luminaire housing second portion has at least one adjustably connected one lamp head and having an adjustable motion sensor. In still further aspects, the housing mount may have a receiving collar, the receiving collar removably receiving the luminaire housing first portion and may further have a locking mechanism to restrain the luminaire housing to the housing mount.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure FIG. 1A is a side assembled view of a rotationally adjustable outdoor security light installed on an eave, according to an embodiment of the present disclosure.

FIG. 1B is a side assembled view of a rotationally adjustable outdoor security light installed on a side wall, according to an embodiment of the present disclosure.

DETAILED DESCRIPTION

Figure 2:
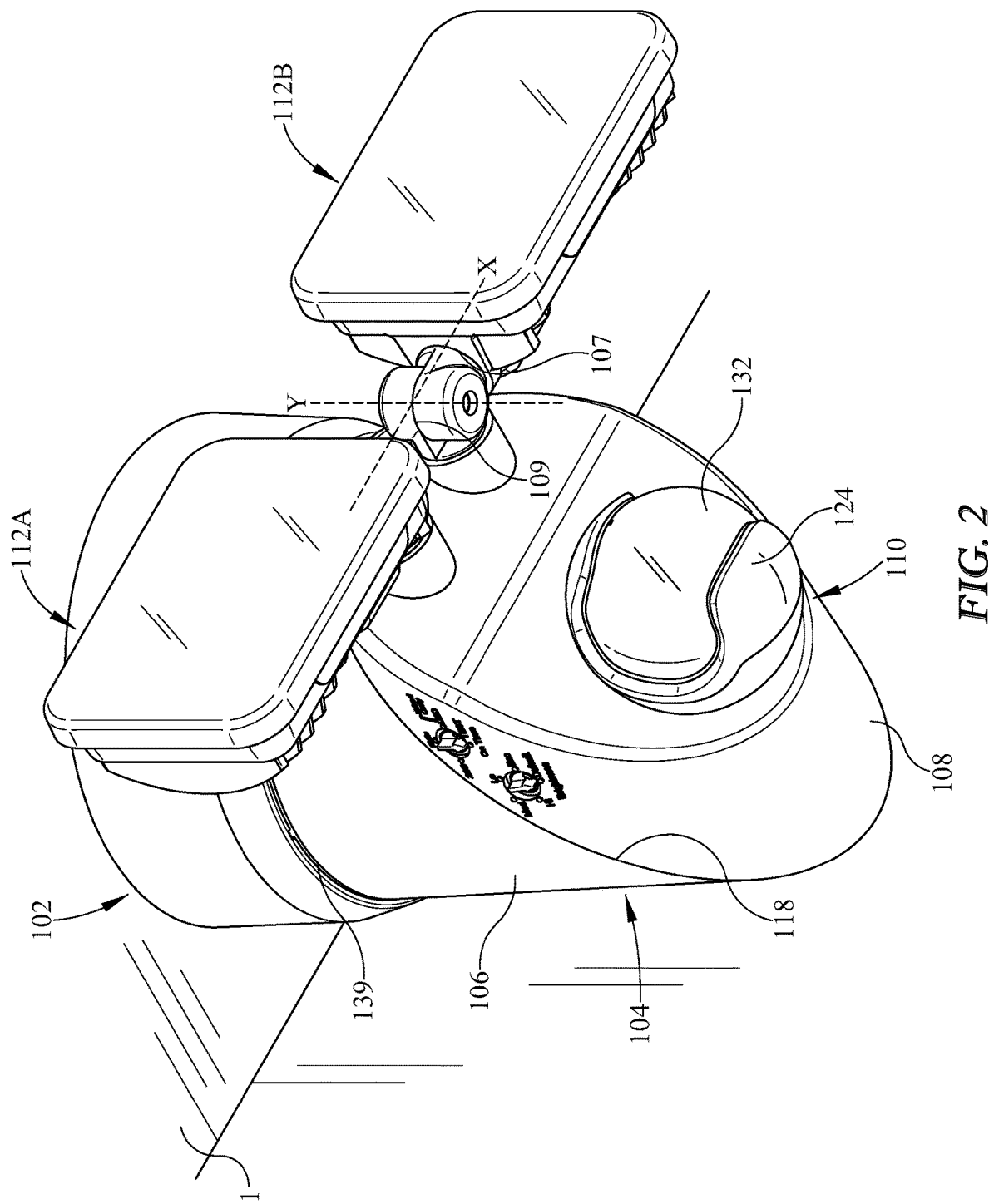
FIG. 2 is a perspective view of FIG. 1A.

As depicted in the drawings, wherein like numbers denote like parts throughout the several views, a rotationally adjustable outdoor security light 100 in accordance with various embodiments will be described with reference to the accompanying drawings. Mounting of the security light 100 may be implemented under various scenarios, and FIGS. 1A and 1B illustrate two typical installations and orientations of the security light 100 to display the overall adjustability with the security light 100. In FIG. 1A the security light 100 is installed under an eave 1 in a horizontal installation and In FIG. 1B the security light 100 is installed on a wall 2 in a vertical orientation against a wall surface. The security light 100 in both orientations is adjustable so as to be forwardly directed to properly illuminate an area when turned on regardless of location of installation while also allowing the motion sensor to adequately view a motion sensing zone.

To allow the security light 100 to be mounted in multiple configurations, as best shown in FIGS. 1A and 1B, the security light 100 includes a separated housing mount 102 and luminaire housing 104, which may be removably coupled to each other. Separation of the housing mount 102 and the luminaire housing 104 improves the installation process of the security light 100 and increases variability of installation locations. As can be understood in looking at the FIGS. 1A and 1B, direct mounting of a typical wall mount as depicted in FIG. 1B to an eave mount would not allow both the lamp head(s) and sensors to be properly oriented towards an illumination zone and detection zone. Particularly, by simply reorienting the luminaire housing flat against the ceiling/eave, the sensor would not be oriented appropriately for detection of movement. Also, the lamp heads may be limited in their adjustability due to low clearance of the ceiling structure. However, providing both a separated housing mount in combination with a rotatable first and second portion of a removable security light luminaire housing alleviates such shortcomings.

Typical installation of the security light 100 set forth herein includes initial installation of the housing mount 102 which is electrically connected to an electrical connection 4 within a junction box 3 in some implementations. Separately, the security light luminaire housing 104 is removably attached to the housing mount 102. The luminaire housing 104 also has both a first portion 106 and a second portion 108, which are rotatable relative to each other, allowing for adjustability as depicted in FIGS. 1A and 1B. Separate installation of the housing mount 102 to the fixed structure increases the ease of electrical connection and fixating its position. Further, the housing mount 102 may provide additional and separated functionality, such as modification of the electricity provided by the wired housing/structure to an adjusted low voltage DC. Hence, the housing mount 102 may provide direct and easy mechanical and electrical connection of the luminaire housing 104 once the initial housing mount 102 is installed. Further, the luminaire housing may be rotatably adjusted for proper clearance and aiming of both the motion sensor(s) and lamp head(s). Hence, separating the housing mount 102 from the rotatably adjustable security luminaire housing 104 improves both mechanical installation, electrical connectivity and illumination of the illumination zone.

The security light includes additional power supply connections separate from the wired connection to the junction box 3. In some implementations, a separate remote solar charging station 114 can provide an additional power source with a rechargeable battery system. The remote solar charging station 114 can be positioned on a roof 7 or other nearby mounting surface to fully expose the solar cells to sunlight for trickle charging of the batteries. Finally, an additional third power supply may be contained within the luminaire housing and may include standard batteries 160 for backup power.

The separated housing mount 102 is adapted to be affixed to an installation surface (e.g., a wall, an eave, a ceiling, etc.) of a building structure. For example, a base or rear portion 150 of the housing mount 102 may include projections, such as a pair of screws 6 (best shown in FIG. 6), for fastening the housing mount 102 to the junction box 3 contained within the structure of the eave 1 or the wall 2, as shown in FIGS. 1A and 1B respectively. Other examples of fastening elements on the base 150, may include but are not limited to, a bracket, a hanger, a brace, a hook, a closed or open slit, a closed or open slot, or other structure enabling attachment of the base to the wall or eave. Alternatively, the housing mount 102 may simply be affixed to the structural surface.

As shown in FIGS. 1A and 1B, the luminaire housing 104 may include the luminaire housing first portion 106 and the luminaire housing second portion 108 which are rotatably secured together. For mounting purposes, the first portion 106 may be removably attached to the housing mount 102, and the second portion 108 is rotatable relative to the first portion 106. For example, a user can rotate the second portion 108 180 degrees relative to the first portion 106 to switch the security light 100 from a horizontal mounting surface as shown in FIG. 1A to a vertical mounting surface orientation as shown in FIG. 1B. Including the separated housing mount 102 and luminaire housing 104 increases the ease of installation of the wired electrical connection to the housing mount 102 while allowing separate installation of the luminaire housing 104 directly to a mounting structure containing electrical contacts. Thus, no additional wiring is necessary. Rotatable luminaire housing portions 106 and 108 further allow orientation modifications for redirection of the lamp heads and motion sensors.

In embodiments, the second portion 108 may be connected to the first portion 106 via a rotatable connection that is angularly displaced between the two portions. The rotatable connections allow rotation of the second portion 108 relative to the first portion 106 so that a user may direct the motion sensor 110 and the light head toward desired locations. For example, the rotational interface between the first portion and the second portion may be along an angled rotational surface or interface 118. In such embodiments, the angled rotational surface or interface 118 is angled relative to a rear mounting plane 139 of the first portion 106. The angled rotational surface 118 between the first portion and the second portion allows the security light apparatus 100 disclosed to be mounted on different surfaces, horizontal or vertical, while allowing the lamp heads and sensor heads to be properly directed outwards toward the illumination and the sensor/detection zone.

In some embodiments, the luminaire housing first portion 106 may be further rotatable relative to the housing mount 102 during installation. The outdoor security light may also include at least one motion sensor 110 and has at least one lamp head 112 rotatably and adjustably located on the luminaire housing 104. In some embodiments, as shown in FIGS. 1A and 1B, the motion sensor 110 may be positioned along a lower section of the rotatably adjustable second portion 108 and independent from the lamp head 112, so that it may be adjustably positioned relative to the housing and aimed towards high traffic areas or other detection zones. For example, a detection zone may be in front of the installation and lower than an illumination zone. The motion sensor 110 may include at least one sensor and supporting electronics and may also include a lens over the sensor to properly focalize the input towards the sensor or sensors. Other electronics of the motion sensor may be located within the luminaire housing first or second portion 106 or 108 to properly interpret the input and send appropriate control signals to a luminaire controller or other electronics.

The security light 100 allows for multiple installation orientations and includes at least one lamp head 112, which may be adjustably connected to the luminaire housing 104 to adjust the light output or illumination zone. In some embodiments, as shown in FIGS. 1A and 1B, the lamp head 112 may be adjustably mounted onto the luminaire housing second portion 108 via an arm 113. In particular, a first end 111 of the arm 113 may be coupled to the second portion 108, and a second end 115 of the arm 113 that is opposite to the first end 111 may be in a knuckle joint configuration and coupled to the lamp head 112. The knuckle joint 115 may be used to appropriately adjust the position of the lamp head 112 to allow the lamp head 112 to be variably positioned three dimensionally so that a user may direct light emitted from the security light 100 in various directions as desired. Although FIGS. 1A and 1B describe using knuckle joints 115 for the adjustment of a lamp head 112, it should be understood that other adjusting mechanisms (e.g., a multi-axis hinge) may also be used to couple the lamp head 112 to the luminaire housing second portion 108. For example, FIGS. 2-7 illustrate a configuration with two lamp heads 112, where the first lamp head 112A and the second lamp head 112B are each rotationally attached to the luminaire housing second portion 108 by a respective first and second rotational hinge 107 and 109. As shown in FIG. 2, the first rotational hinge 107 may rotate about a first rotation axis X while the second rotational hinge 109 may rotate about a second rotation axis Y, and the first rotation axis X may be perpendicular to the second rotation axis Y. It should be understood that even further embodiments may allow for a separated lamp head 112 remote from the luminaire housing 104 and connected thereto by an electrical connection to power and control the illumination sources. For example, a separate lamp head 112 may be individually mounted on a supporting structure by mechanical or magnetic means and be electrically connected to the luminaire housing 104 for electrical connectivity.

Figure 4:
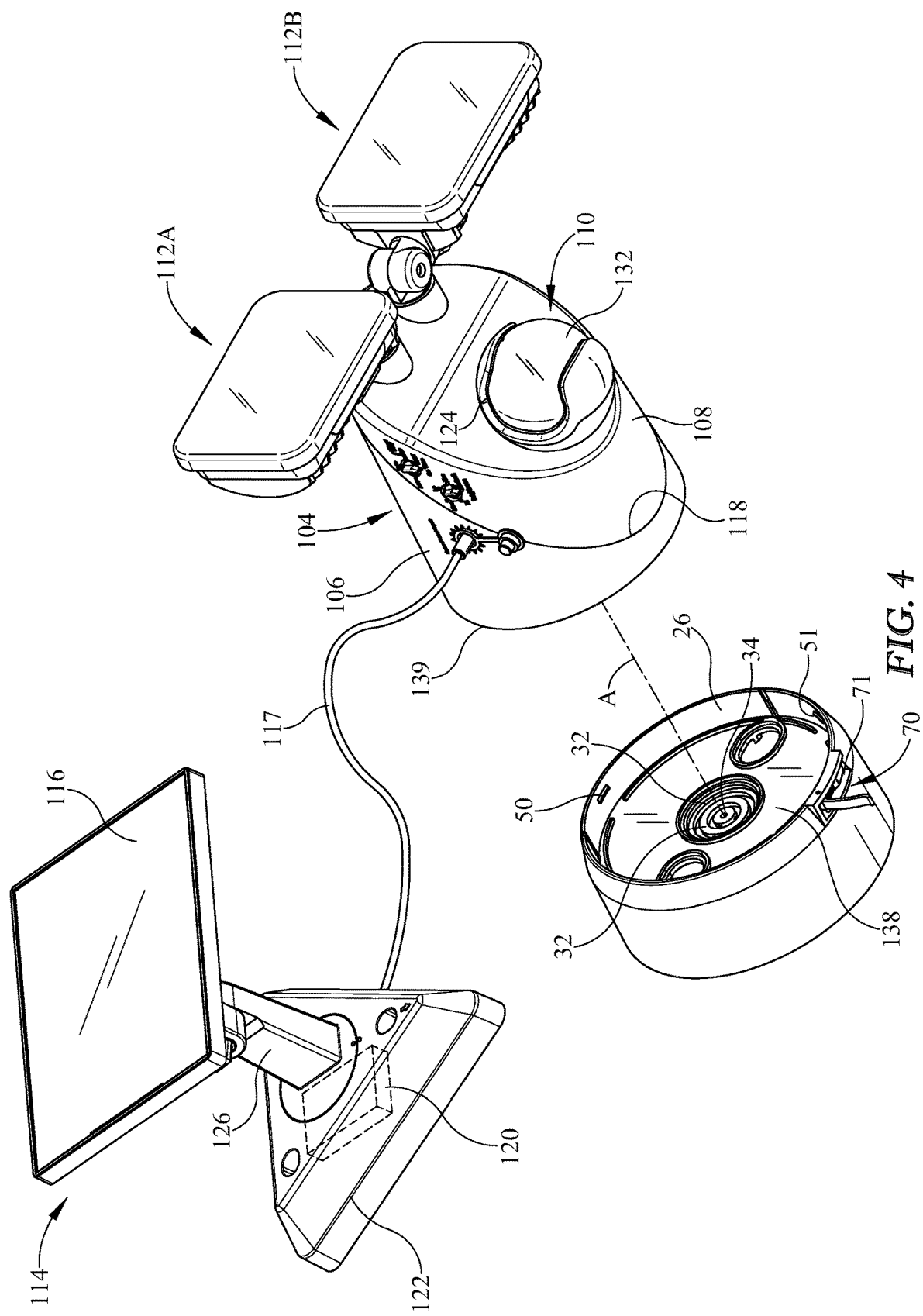
FIG. 4 is an exploded view of a rotationally adjustable outdoor security light connected to a solar battery panel, according to an embodiment of the present disclosure.

In addition to being powered by a wired electrical source (e.g., the electrical junction box 3), the security light 100 may also be operably connected to a multiple separate power supplies and allow the security light to switch between the wired line voltage and other alternative power sources, such as a remote solar charging station. In some embodiments, a remote solar charging station 114 may be provided to supply electricity to the security light 100 in addition to a line voltage provided by the junction box 3. As shown in FIGS. 1A, 1B, and 4, the remote solar charging station 114 may include photovoltaic cells (PVC) 116, and may be connectable to the security light 100 by plugging a removable power transfer cord 117 into a solar panel input on the luminaire housing 104. The solar charging station 114 may include at least one rechargeable battery or other power storage 120, which fits within a base 122. In some embodiments, the solar charging station 114 may be utilized to charge the rechargeable battery 120 contained within the station. In providing a remote solar charging station 114 and associated charging circuit and control electronics, the user may select between possibly multiple electrical supply connections.

In various embodiments, the solar charging station 114 may be directly adjacent with the security light 100 or may be positioned remotely therefrom. In some embodiments, the solar charging station 114 may be mounted in a location which is more conducive to collection of sunlight on the PVC 116. For example, the charging station 114 may be a remote charging station positioned on the roof 7 while the security light 100 may be positioned underneath of the eave 1 where the sun would not regularly be available for charging of the batteries. Thus, in some installation configurations, a remote installation for the charging station 114, such as on the roof 7, is efficient for charging the power supply.

As shown in FIGS. 1A, 1B, and 4, the solar charging station 114 may be hingedly affixed to the base 122 by a hinged connection 126 so that the PVC 116 may be appropriately directed towards the sun during the day. Adjustment allows maximizing conversion of the sunlight to electricity for the charging cycle of the rechargeable battery 120 and power supply of the security light 100. The arm and hinged connection 126 may further be rotatable on the base to allow for two axis adjustments of the PVC 116. The base 122 may also include appropriate attachment mechanisms to affix directly to a wide variety of attachment structures and configurations (e.g. a roof, a wall, etc.). For example, the base may mechanically attach to a structure via screws, may be frictionally attached to a surface, Velcro or other systems/connections to removably or permanently attach one or all of the parts of the station 114 to a structure.

The remote solar charging station 114 may incorporate the PVC 116 of sufficient size in order to recharge the rechargeable battery 120 in order to appropriately power the lamp head 112 and power the associate controller electronics and sensors. The rechargeable battery 120 is sized sufficiently to power the control electronics and the load for desired illumination characteristics when motion is detected as well as to provide illumination under normal operating conditions. For example, in various embodiments, an arrangement of the PVC 116 having an area of about 200 cm$^2$ and a standard or average efficiency of 16% may create 12 watt-hours of electricity which can be stored in the rechargeable battery 120 on a day having 4 hours of sunlight. Depending upon the configuration of specific lamp head 112 or multiple lamp heads, and considering the number of times the system is activated by the motion sensor 110, the system may allow for activation of the lamp head 112 about 15-30 times a night which may utilize approximately 4 watt-hours. The rechargeable battery 120 may have a battery storage requirement that is sufficient to appropriately store 12 watt-hours or more, even with successive non-sunny days.

In some embodiments, the base 122 of the solar charging station 114 may include a charging circuit and related controllers. In embodiments, charging circuits may be integrated with the rechargeable battery 120 and the remote solar charging station 114. Such charging circuits may include known techniques for receiving the low voltage from the PVC 116 which may be anywhere between single volt up to a standard 12 volts, depending on the number of cells respectively connected together. Typically, individual cells produce an open circuit voltage of about 0.5 to 0.6 volts at 78° F. This voltage and the associated current are managed by a charging circuit or other electronics for proper regulation, modulation, modification for trickle charging of the rechargeable battery circuit. Such electronics further protect the rechargeable battery 120 from overcharging, monitor battery charge levels and temperature, report levels to a controller and limit input and output current to the various parts of the system. Such solar charging station 114, while disclosed as being remote from the security light 100, may alternatively be affixed to the security light 100 in other implementations. The electronics positioned within the base 122 may also be incorporated within the security light 100 and control signals transferred therefrom by the associated power transfer cord 117.

Figure 9:
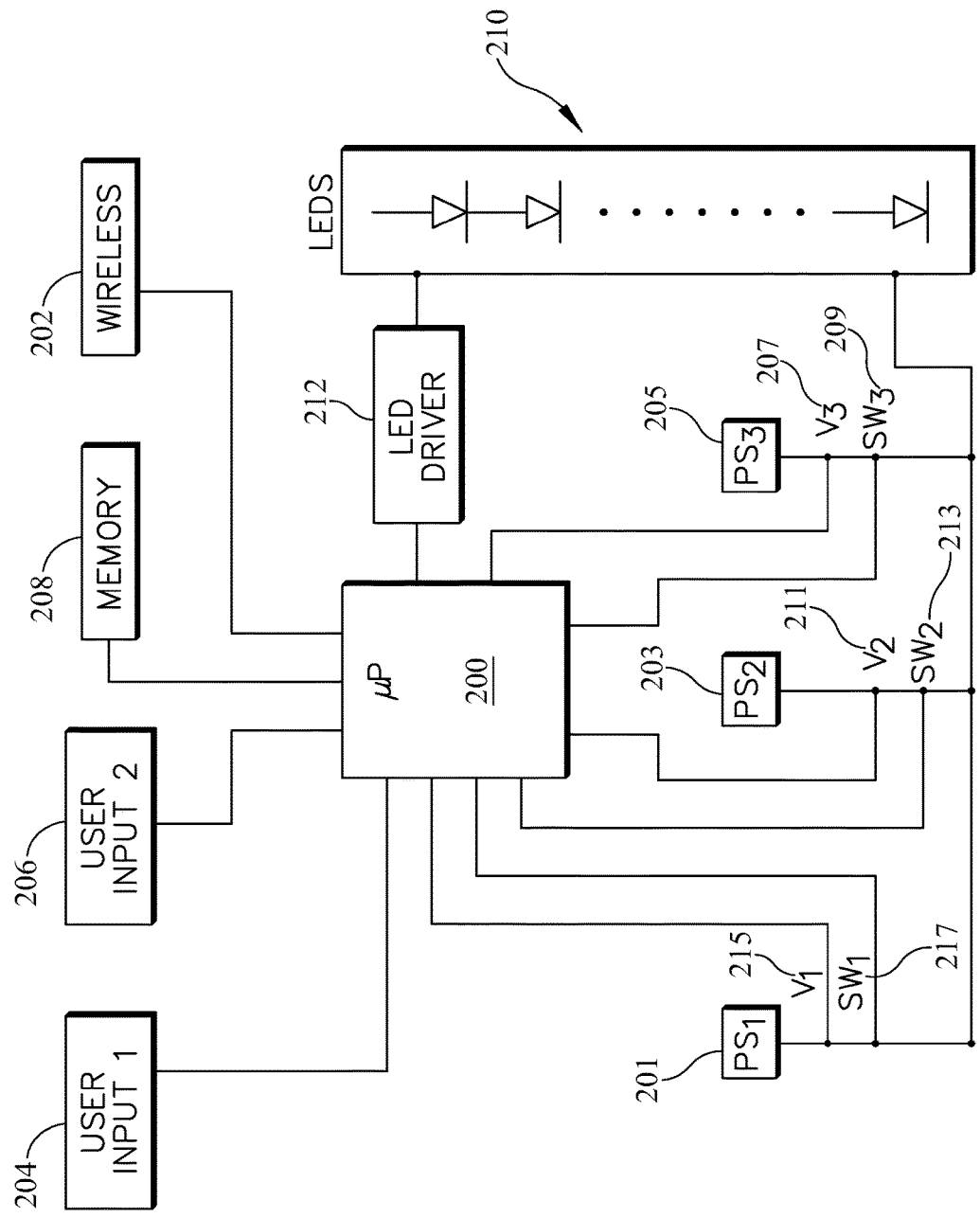
FIG. 9 is a block diagram showing elements of the control circuits and system in one embodiment of the present disclosure.

The lamp head 112 (e.g., a light bulb, an LED diode, etc.) may utilize various light sources, such as, inter alia, an incandescent lamp, a high intensity discharge (HID) lamp, a light emitting diode (LED) lamp, a halogen lamp, a fluorescent lamp, or any other suitable type of light source. For example, the lamp head 112 may be color LEDS to provide variability in color and/or color temperature. Colors may be implemented by various techniques including known color mixing of predefined color LEDs, modifying color output using luminescent materials, driving LEDs at varying intensity to meet color output requirements, among other known embodiments. For example, in some embodiments, the lamp head 112 may be white LEDs or may be a combination of colors in order to generate white light. The LEDs may also contain blue LEDs, which interact with a phosphorescent or other film over the lens. Color, brightness, direction and other control may be implemented through a lighting controller 200 as depicted in FIG. 9 or through the LED drivers 212 or other similar electronics.

The lamp head(s) 112 may be controlled by various remote devices including, for example, a user smart phone, a web based or app-based control, a built-in motion sensor/detector, and/or a built-in light sensor/detector. Various embodiments for control drivers of the lamp head 112 may be utilized including microprocessors, linear AC drivers or constant current regulators. In some embodiments, the linear AC drivers are ASICs. Other LED or light output drivers and controllers may be used. The lamp head 112 light sources may be provided as LED arrays, segments or individual emitters, any of which may be directly addressable and hence drivable by control and/or microprocessors. Such may include current regulators, voltage regulators, micro-controllers and other circuitry to maintain illumination levels and lighting characteristics of the lamp head 112 light output.

The lamp head(s) 112 may be configured to illuminate at different light intensity levels. For example, the light source of the luminaire may be capable of dimming, or illuminating at a low/medium/high intensity level. In this manner, the lamp head 112 may operate at brighter light intensity levels in certain situations, at moderate intensity levels, at lower intensity levels, or at a zero-intensity level (i.e., turned off). In some embodiments, user specified alternative preferences may further include flashing or blinking the lamp head 112 under predefined conditions. For example, in some embodiments, one or more luminaires or light source units within multiple or a singular luminaire may be programmed to flash intermittently to indicate an alert or warning condition, such as the detected interruption of power. Alternatively, a flashing alert or warning condition may be implemented by programming or user adjustment of controls by one or more LED segments upon detection of motion while concurrently increasing illumination intensity of all remaining illumination segments. Each of these user defined light output characteristics can be programmed and controlled by the controller 200 and be stored in system memory 208.

When the lamp head 112 includes multiple light sources, such as with LEDs, the multiple light sources may be separately controllable and addressable. This allows for a two-step functionality, where different light sources are separately and independently activated in response to respective conditions. For example, as shown in the FIG. 2, the first lamp head 112A may be activated/deactivated based only on low-light conditions being detected by a light sensor, whereas the second lamp head 112B may be activated/deactivated based on both motion detected by the motion sensor 110 and a low-light conditions are also being detected by the light sensor. The low-light condition can be any condition where the amount of light detected by the light sensor falls below an activation threshold, which can be a factory preset threshold level or a threshold level that is adjustable by an end user.

The security light 100 may be adjusted to be operable, such as being well-suited for an eave-mounted, wall-mounted, ceiling-mounted, and/or freestanding security light. Further, alternative power sources may be configured for the electricity needed for operation. As shown in FIGS. 1A and 1B, the security light 100 may be adapted for connection to a wired external power source, such as the junction box 3 with a 110V or 220V line voltage electrical service, the remote solar charging station 114 with rechargeable batteries 120, and/or one or more internal batteries 160.

Figure 3:
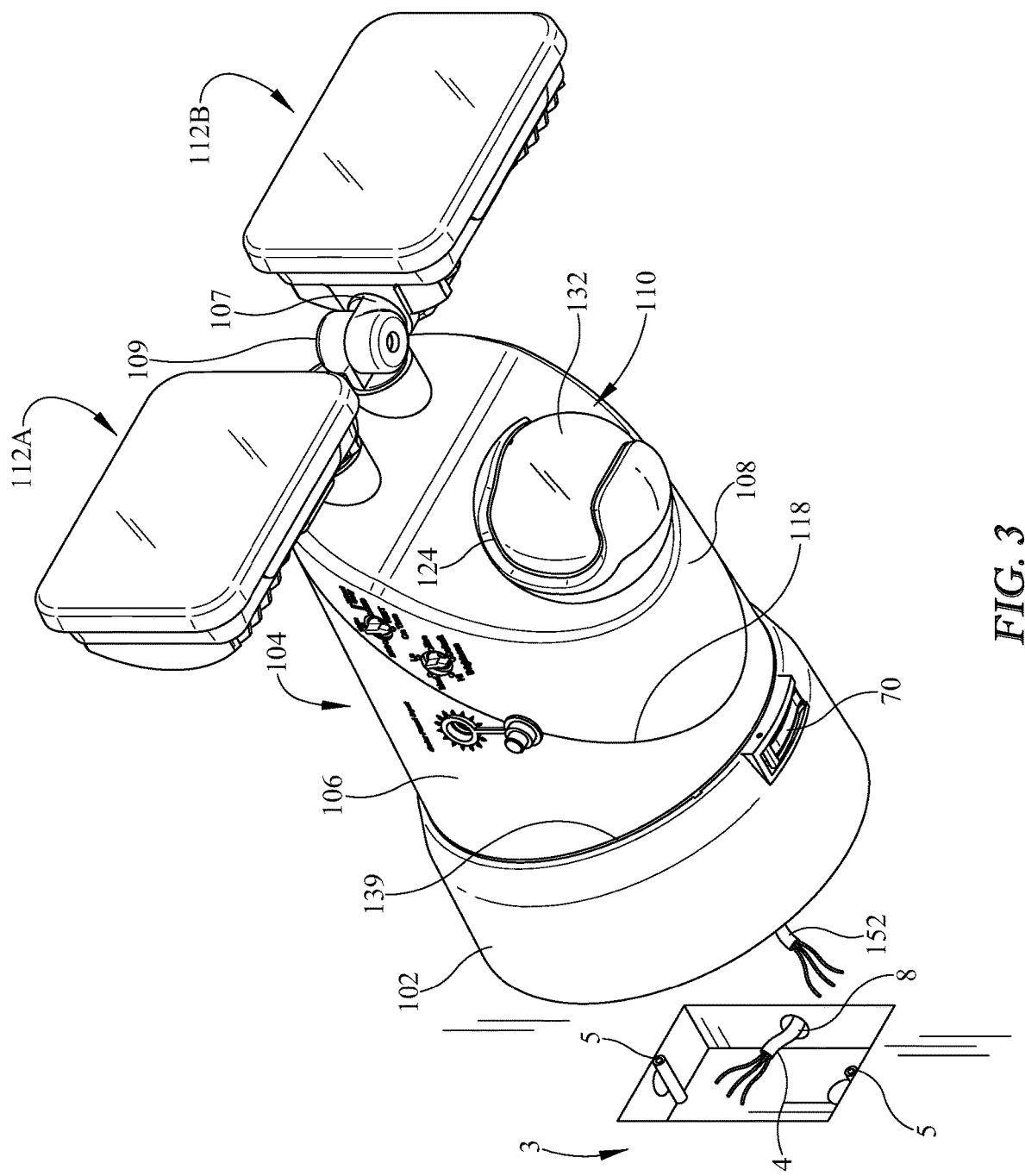
FIG. 3 is a perspective view of a rotationally adjustable outdoor security light connected to a side wall, according to an embodiment of the present disclosure.

FIG. 3 illustrates an embodiment of the housing mount 102 of the security light 100 separated from an associated junction box 3. In some embodiments, the housing mount 102 may be mechanically connected by screwing the housing mount 102 to the junction box 3. Such installation attaches the security light 100 to the housing mount 102 and subsequently to the junction box 3 or adjacent structure on the wall in which the junction box 3 is installed. Further, electrical wiring cables 4 within the junction box 3 may be connected to an electrical connector 152 to provide a wired line voltage electrical connection to the security light 100 and the embedded electronic components. The electrical connector 152 may be connected to Romex wires 4 (the 110V AC hot, neutral, and ground wires) from the junction box 3 which are threaded through junction box aperture 8. In some embodiments, typical mounting structures may be provided to allow for the housing mount 102 mounting to the junction box 3 on a surface of a building, such as on an eave, ceiling, wall, or other structure. For example, screw sleeves 5 positioned on the interior of the junction box 3 may receive mounting screws 6 to fasten the housing mount 102 directly to the junction box 3. It should be understood that in this embodiment, any commonly known method of electrically connecting a wire may be used, including, but not limited to, clamping, soldering, clipping, the use of screw terminals, insulation displacement connections, control block style pushing arrangements, or any other method or apparatus. For example, the electrical connector 152 may be twist cap connected to the double insulated multi-conductor cable, oftentimes referred to as ROMEX.

In embodiments as shown in FIG. 3, the security light 100 may obtain electricity via the Romex wires 4 from the junction box 3. The electronics within the housing mount 102 may accept standard 120V AC line voltage provided by the junction box 3 and modify. Such modification may be conversion to low voltage DC. The converted electricity can then be provided to the associated components and the lamp head 112 through a low voltage connection between the luminaire housing and the housing mount. Such modifications may include AC to DC conversion, PWM drivers, smoothing or chopping circuits and the like as are well-known in the art to provide adequate power to the luminaire. Such electronics may include AC to DC converters, capacitors, and other electronics with voltage and current modification techniques.

Various embodiments are shown for the mechanical and electrical connections between the junction box 3 and the housing mount 102. It should be understood that a variety of mechanical and electrical connectors and methods may be used to fasten the housing mount 102 to the junction box 3 mechanically and connect the Romex wires 4 from the junction box 3 to the housing mount 102.

Figure 5A:
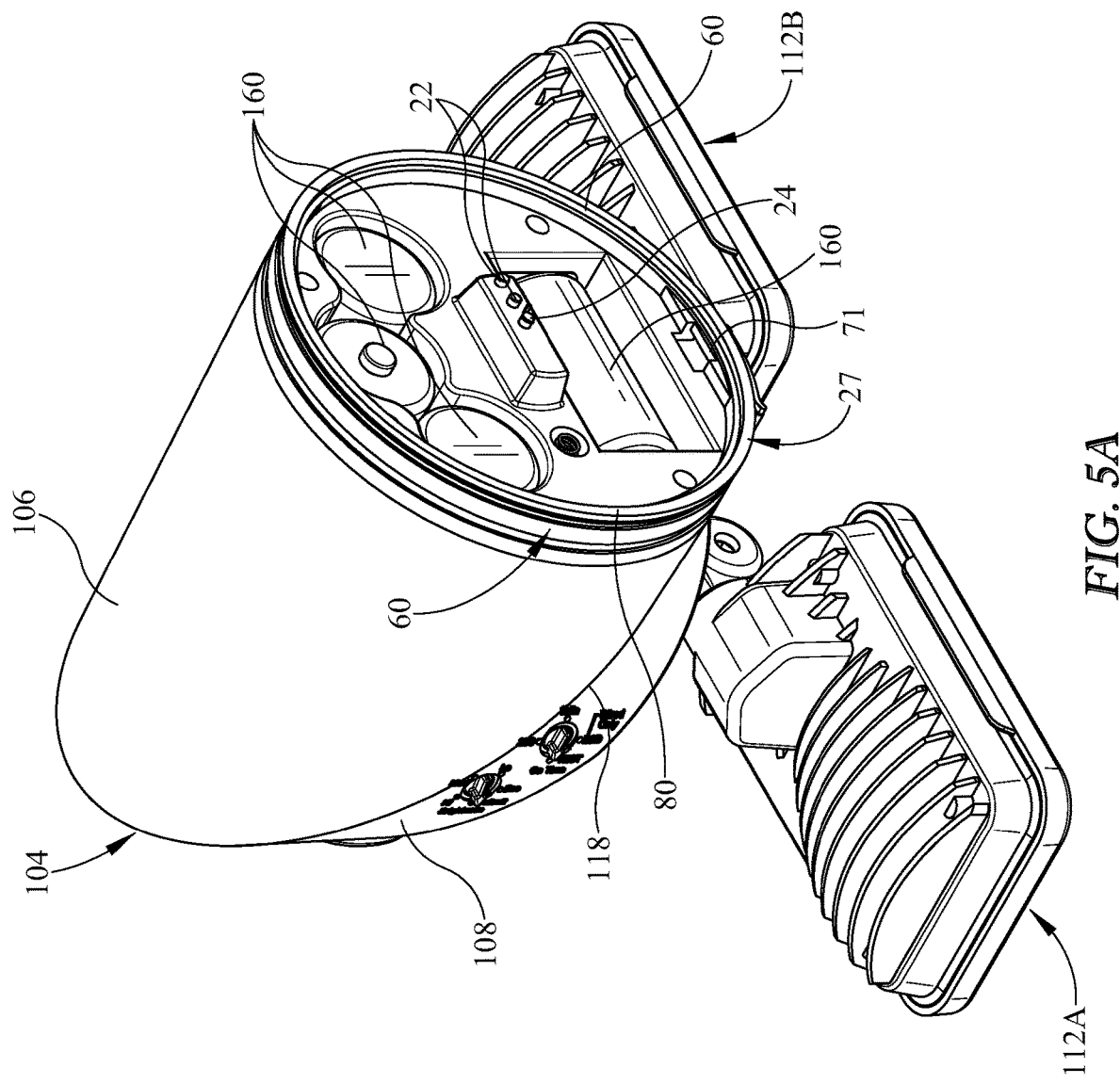
FIG. 5A is a rear perspective view of the rotationally adjustable security light of FIG. 2 with the rear panel removed, according to an embodiment of the present disclosure.
Figure 5B:
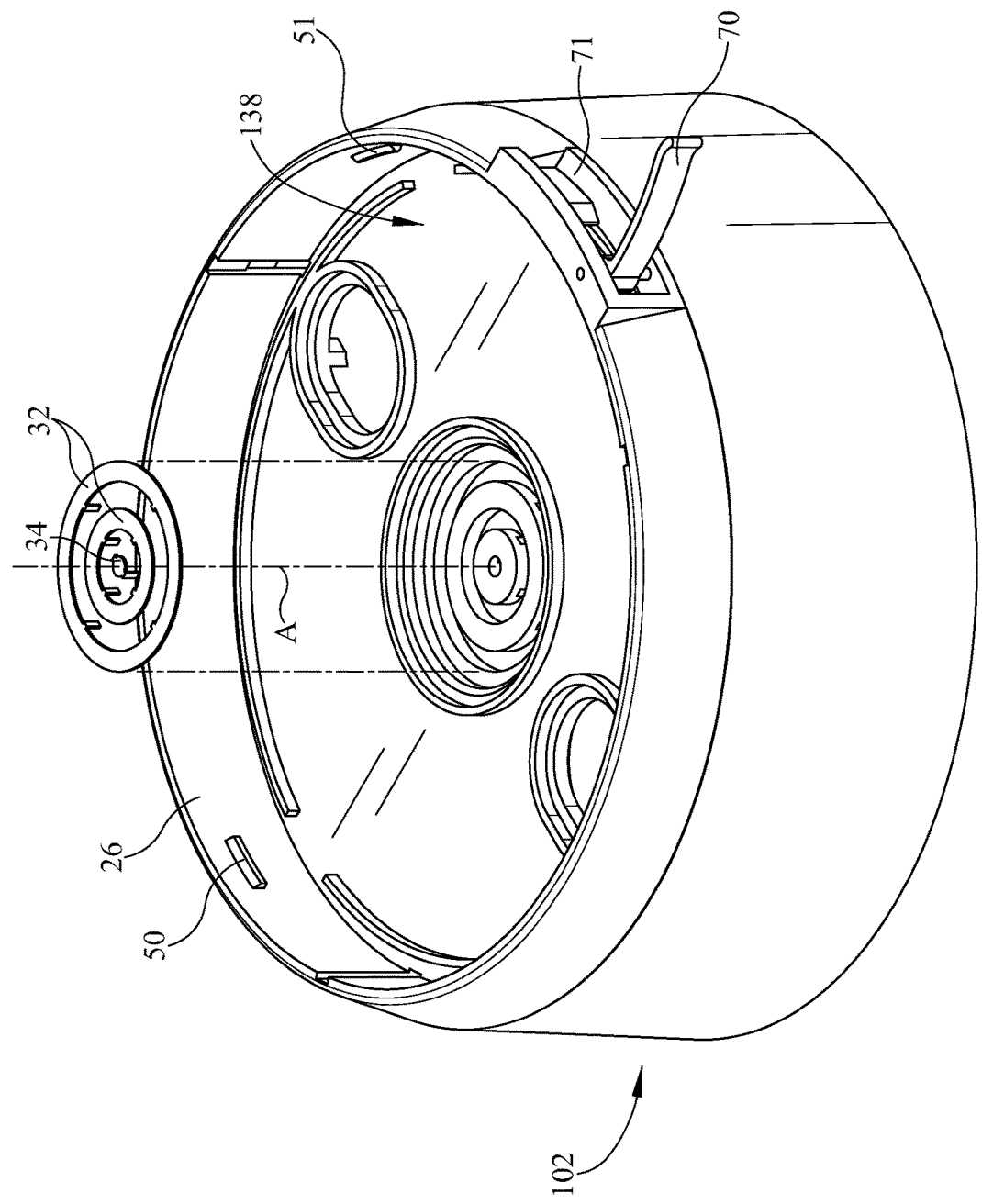
FIG. 5B is a front view of the mount housing mounting plate, according to an embodiment of the present disclosure.
Figure 6:
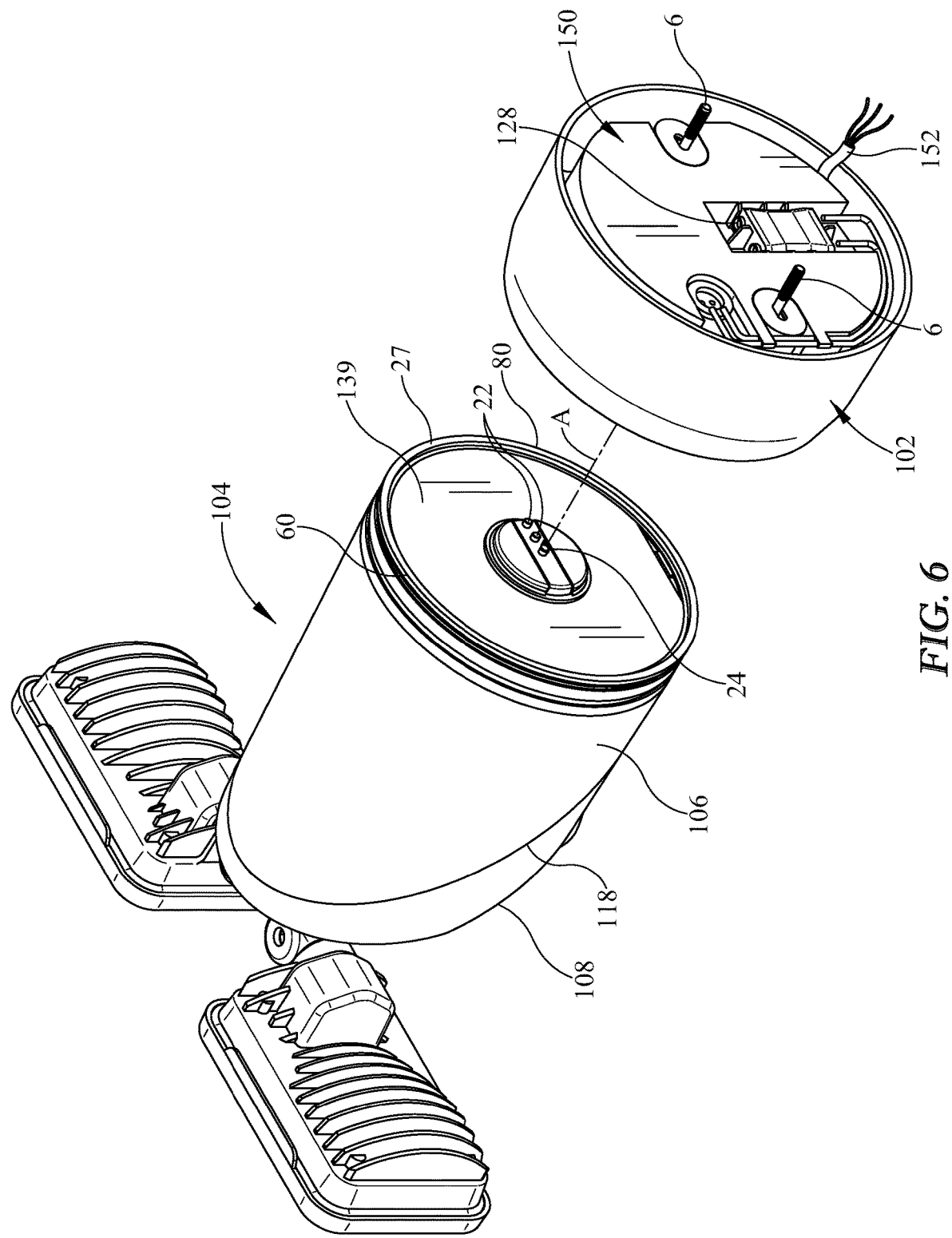
FIG. 6 is a rear perspective view of a rotationally adjustable outdoor security light with the housing mount separated from the luminaire housing first and second portion, according to an embodiment of the present disclosure.
Figures 7, 7A:
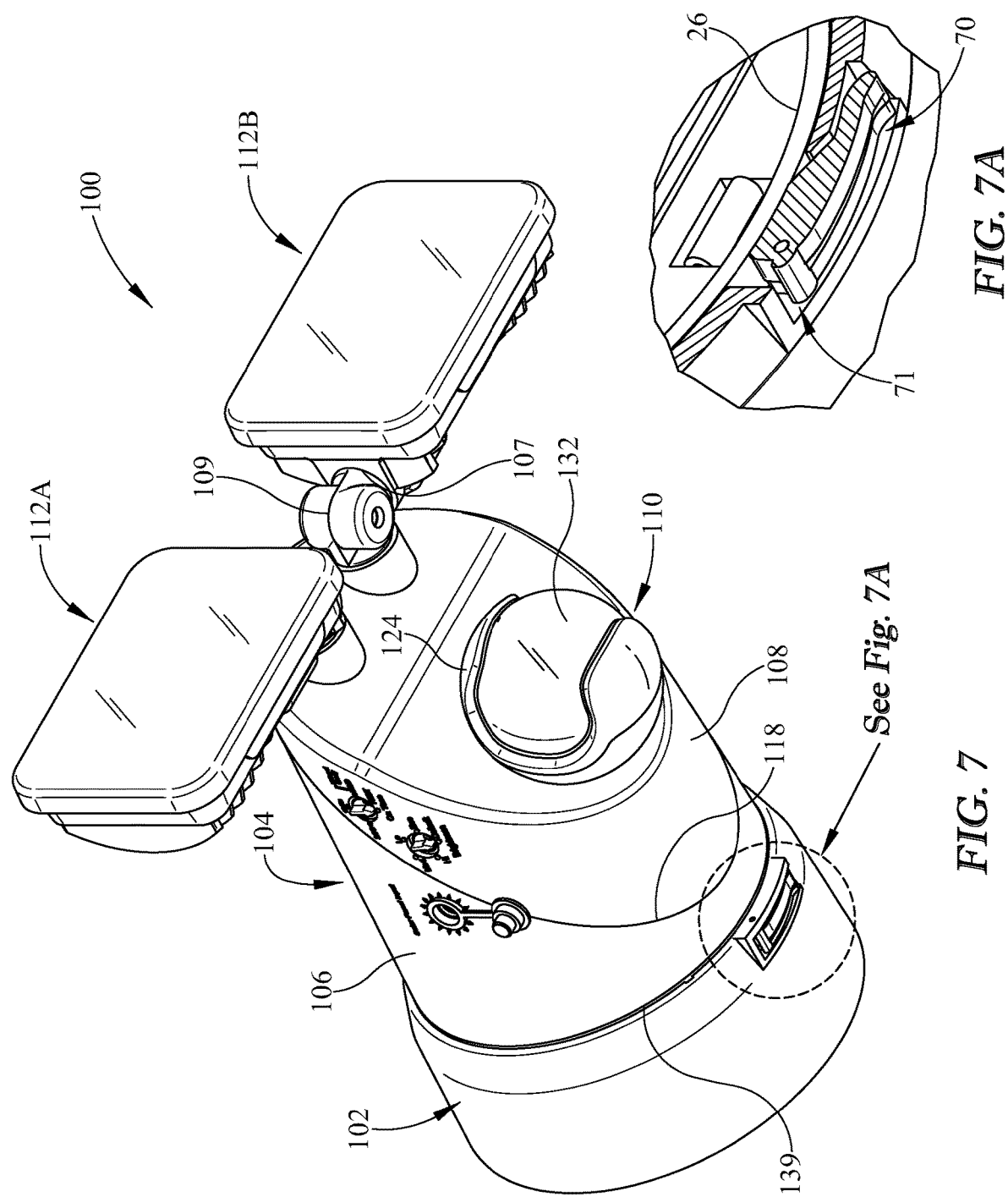
FIG. 7 is a perspective view of a rotationally adjustable outdoor security light, according to an embodiment of the present disclosure.
FIG. 7A is an enlarged sectional view of a collar portion of FIG. 7, according to an embodiment of the present disclosure.

As shown in FIGS. 4-6, the electrical power may be provided to the security light 100 via electrical low voltage contacts between the housing mount 102 and luminaire housing 104, thereby allowing the luminaire housing to be wired without additional hard wiring as is typical. For example, the electrical contact between the first portion and the housing mount 102 may be quick connect low voltage electrical contacts. When assembled, the luminaire housing 104 may rotate relative to the installed orientation of the housing mount 102 allowing the initial orientation of the junction box 3 and/or the housing mount 102 to not limit the orientation of the motion sensor 110 and the lamp head 112. That is to say that the security light 100, in one of the many implementations, is always electrically coupled regardless of the rotational orientation between the luminaire housing 104 relative to the housing mount 102.

In implementations, the electrical connection between the housing mount 102 and luminaire housing 104 includes ground, neutral, and hot connections. In some implementations, these connections may be maintained for up to about 360 degrees of rotation or less (e.g. CW and/or CCW) about an axis A as shown in FIGS. 4 and 6. Electricity for the security light 100 is supplied through the rotational quick connect construction providing low voltage DC to the security light. In some installations, the luminaire housing 104 of the security light 100 initially attaches to the housing mount 102 at an offset angle between the two structures allowing rotation to be a part of the installation. For example, installation may require rotation of the luminaire housing relative to the housing mount 102 by 20-40 degrees before the two structures are in a final locked orientation. In some embodiments, rotational electrical connection may be a full 360 degrees. In other implementations, the rotational electrical connection may be less, for example between 90 and 180 degrees. In some implementations, the rotation between the two structures acts to mechanically lock the structures together. For example, helical threads on both structures may be used to properly orient and lock the two structures together. In still further examples, there may be a direct connection between the housing mount 102 and the luminaire housing 104, which does not require rotational adjustment. For example, the luminaire housing 104 may snap fit, friction fit or be installed in the proper orientation to the housing mount 102.

In some embodiments, the rotational electrical contacts between the housing mount 102 and the luminaire housing 104 may be concentric contacts located on respective receiving interfacing surfaces of the two components. When the two components are in a mounted contacting position, the contacts may be aligned to corresponding opposing contacts on the receiving surface, allowing the power to be exchanged between the contacts. As shown in FIGS. 4-6, electrical contacts or connections 32, 22 between the housing mount 102 and the luminaire housing 104 may be rotatably electrically engaged during the rotation (e.g. in the plurality of rotational orientations of the luminaire housing 104 in respect to the housing mount 102). The one or more electrical contacts 22 of the luminaire housing 104 (as shown in FIGS. 5A and 6) may have rotational contact with the one or more respective electrical contacts 32 of the housing mount 102 (as shown in FIGS. 4 and 5B). The one or more electrical contacts 22 of the luminaire housing 104 rotates with the luminaire housing 104 and maintains the contact (e.g. axial and/or radial contact, etc. for 360 degrees contact about the axis A) with the fixed connections 32 of the housing mount 102. Stated alternatively, the one or more engaging contacts 22 may be rotationally held in electrical contact with the other corresponding contacts 32 at the housing mount 102 during any point of the rotation. Thus, in some embodiments, the rotatable luminaire housing 104 may be in rotational connection with the housing mount 102 wherein electrical connectivity between the light luminaire housing 104 and the housing mount 102 is maintained during all points of rotation. In other embodiments, rotational connectivity may be maintained only during a predefined rotational extent wherein the luminaire housing 104 is energized at recognized rotational points relative to the housing mount 102 while at other points during the rotational extent relative to the two the electrical connections may be interrupted. Similar aspects and features may be implemented in a rotatable electrical plug connection as well.

For example, in the embodiment shown in FIGS. 4-6, the luminaire housing 104 may include a first and second rearwardly projecting electrical contacts 22 in a tensioned leaf spring or brush configuration, engaging the electrical contacts 32 in a concentric annular ring configuration (e.g. hot and neutral) of the housing mount 102. The contacts may include a centrally located coil spring 24 for ground with a corresponding centrally located disc 34 of the housing mount 102. In such embodiments, the first and second rearwardly projecting electrical contact 22 may maintain electrical connectivity to the energized concentric annular rings 32 during the entire rotational extent of the luminaire housing 104 relative to the housing mount 102 while the rings 32 are continually in electrical connectivity to respective hot, neutral and ground wiring from the junction box 3.

As depicted in the example of FIG. 5B, the annular contact rings 32 and disc 34 may be electrically connected to respective hot, neutral and ground connections from the junction box 3. Upon installation of the luminaire housing 104 onto the housing mount 102, the first and second rearwardly projecting electrical contacts 22 may engage the respective annular ring 32 and thereby be electrically connected to the respective line of the junction box 3 without the user having to directly wire the light fixture. The spring 24 or other similar engagement surface, tab, contact or spring can be electrically connected to the disc 34. The first and second rearwardly projecting electrical contact 22 and the spring 24 for example as depicted in the embodiments here, could allow for not only continued engagement around a rotational extent of engagement between the structures but also elevational differences thereby maintaining electrical connectivity at differing connection heights between the luminaire housing 104 onto the housing mount 102.

In various constructions, as shown in FIG. 5B, the plurality of rings 32 of the housing mount 102 may be installed within a corresponding number of annular extending grooves formed within the base to fixedly retain the rings therein. Further, the disc 34 may be centrally positioned within the annular grooves and the annular rings within a recess formed in the housing mount 102. The recess and annular grooves form a mechanism to positionally retain both the annular rings 32 and the contacts from the luminaire within the housing mount 102.

In some embodiments, one or more structures of the luminaire housing 104 and/or the housing mount 102 may axially and/or rotationally engage each other to allow relative rotation and/or energizing of the security light 100. Alternatively, or in combination with the light fixture structure, the user may need to axially and/or rotationally maintain the luminaire housing 104 with the housing mount 102 until the rotational orientation is fixed. For example, with the luminaire housing 104 assembled with the housing mount 102, the electrical contacts 22, 32 may be engaged/energized. In some embodiments as shown in FIGS. 4 and 5B, one or more retention members 50 (e.g. lugs, taps, projections, dimples) may be used to axially retain the luminaire housing 104 with the housing mount 102. The retention member 50 may also allow for relative rotation between the luminaire housing 104 and the housing mount 102. The retention member 50 may be received within one or more receivers 60 located on a skirt 27 of the luminaire housing 104.

In the embodiment shown in FIG. 4, the housing mount 102 may include a receiving collar 26 for removably receiving the luminaire housing first portion 106, and one or more retention members 50 project inwardly from the receiving collar 26 of the housing mount 102. In some embodiments, the receiving collar 26 may surround a housing mount receiving plate 138.

When assembled, the receiving collar 26 may overlap a sidewall or skirt of the luminaire housing 104. The luminaire housing 104, in the embodiments shown, includes the receiver 60 in the skirt 27. In such embodiment, the receiver 60 may be an annular groove, channel, wall or other abutting structure. The one or more retention members 50 engage the receiver 60 thereby locking the housing mount 102 and the luminaire housing 104. This may allow the user to have hands free retention until rotation or other mechanical connection of the luminaire housing 104 is needed, if any. The one or more retention members 50 may travel 360 degrees or a portion thereof within the receiver 60 and allowing the rotation of the luminaire housing 104 relative to the housing mount 102. Although the receiver 60 may be a continuous groove about the outer periphery of the skirt 27 of the luminaire housing 104, it should be understood that the receiver 60 may be a variety of constructions including variations in sizes, locations and shapes.

In some embodiments, the luminaire housing 104 may be secured in at least one orientation relative to the housing mount 102. A mechanical locking structure/mechanism 70 may be used to retain the luminaire housing 104 within the housing mount 102 or vice versa. For example, any structure outlined may be swapped in position between the two structures so that the interference fit or retention is maintained. For example, a cam lock or latch 70 may be used to lock or fix the position between the two structures. When in a disengaged position as shown in FIG. 4, the locking mechanism 70 (e.g. a cam lock/latch) allows the luminaire housing 104 to rotate about the axis A/housing mount 102 and be installed. Although the cam lock 70 is shown in the embodiments, it should be understood that a variety of one or more locking mechanisms may be used to fix the position between the luminaire housing 104 and the housing mount 102. The locking mechanism 70 may include, for example, geometric coupling (e.g., dovetails, tongue-and-grooves, pin-and-slots, etc.), and fasteners of many types (e.g., screws, bolts, rivets, pins, ball detents, spring retainers, etc.). For example, in some embodiments, screws which enter into the side of the fixture and which contact the housing mount 102 to maintain relative position between the luminaire housing 104 and the housing mount 102 may be utilized. As well, for example, rotational stop-locks with threads engaging between the two structures, engagement lugs which engage at specific rotational positions, push and turn engagement structures between the between the luminaire housing 104 and the housing mount 102 may also varyingly be implemented.

In some embodiments, the rotational locking mechanism 70 and the one or more retention members 50 may axial secure the luminaire housing 104 with the housing mount 102. The one or more retention members 50 may releasable engage (e.g. axial disengagement) from the annular groove allowing replacements, repair, or attaching a different style fixture housing, etc. Further, in some embodiments, the one or more retention members 50 may allow the user to identify that the engagement (e.g. axial) between the housing mount 102 and luminaire housing 104 has been reached and/or disengaged by creating a characteristic identified by the user such as, but is not limited to, an audible click, visual identification, feel, marked rotational position identifiers, etc. Although the retention members are shown as an arcuate projecting tab and the annular groove is shown with an arcuate profile, it should be understood that the retention member/groove may be different in shape, size, quantity, position, and construction. Moreover, for example, the axial/rotational structural engagement may be incorporated in either housing/base. Further, implementation without retention members can be achieved. For example, a friction fit and other locking structure can be implemented. For example, the diameter of the collar can be similar but slightly larger than the skirt 27 allowing the skirt to be frictionally received into the collar.

For example, in some other embodiments, the rotational locking mechanism 70 may be used, alone or in combination with other structure (e.g. the retention member 50), to axially and/or rotationally fix the luminaire housing 104 to housing mount 102. For example, the one or more rotational locks 70 may partially be inserted into an annular groove 71 in the outer periphery of the skirt 27 of the housing mount 102 allowing axial retention. The retention is maintained while also being able to rotate of the luminaire housing 104 until the user decides to fully engage the rotational locking mechanism 70 to fix the rotational orientation. If no retention members are used, one or more rotational locks may be used alone to lock the axial and rotational position of the luminaire housing 104.

In some embodiments, the one or more retention members 50 may include one or more different retention members 51. The one or more retention members may be different in shape, size, quantity, position, and construction. For example, as shown in FIG. 4, the retention members may include at least two separate retention members 50 and 51 to aid in separation/engagement of the luminaire housing 104 with the housing mount 102. Alternatively, a first retention member 50 may be considered a "hard stop" and a second retention member 51 may be considered a "soft stop". The second retention member 51 may maintain axial rotation/axial engagement but allow for removal/attachment to the groove. The first retention member 50 may be used in combination with the rotational locking mechanism 70 to secure the rotational position and/or engage the sealing function of the one or more gaskets 80 and/or maintain axial rotation/axial engagement. The second retention member 51 may assist the user in removing/attaching the luminaire housing 104 from the axial and/or rotational engagement. For example, the first retention member 50 may be unable to disengage from the receiver 60 unless the second retention member 51 disengages first. Further in some embodiments, the first retention member 50 may need to be axial engaged with the receiver 60 first before the second retention member 51. In some embodiments, the second retention member 51 may require less axial removal force than the first retention member. As shown in the embodiments in FIGS. 4 and 5B, the first retention member 50 may be positioned on an opposing side of the locking mechanism 70. This may balance the forces to secure the engagement between the luminaire housing 104 and the housing mount 102. It should be understood that the one or more first and/or second retention members may be in a variety of locations, shapes, sizes, constructions, and quantities.

In some embodiments, when axially engaged the one or more retention members 50 and/or the locking mechanism 70 may engage the receivers 60/annular groove 71 thereby coupling the luminaire housing 104 with the housing mount 102 and/or the electrical connections 22, 32 therebetween. A characteristic of the correct engagement therebetween may be identified by the user such as an audible/visual indicator. With the one or more retention members 50, if used, engaged with the receiver 60/annular groove 71, the luminaire housing 104 is engaged (e.g. axially) such that the user may freely rotate the luminaire housing 104 relative to the fixed housing mount 102. Moreover, the luminaire housing 104 may maintain the electrical coupling between the luminaire housing 104 and the housing mount 102 during the rotation of luminaire housing 104. The user may rotate the luminaire housing 104 to aim, orient features of the security light 100, etc. as desired by the application or user. Once the desired rotational orientation is achieved, the user may lock the rotational orientation via the locking mechanism 70. Subsequent rotational adjustments may be made merely by temporarily disengaging the locking mechanism 70. Further, the user may desire to change to a different luminaire housing 104 and still utilize the housing mount 102, make repairs, or change light sources by disengaging the luminaire housing 104.

In some embodiments, the one or more retention members 50, the receivers 60, the locking mechanism 70, and/or the annular groove 71 are not used to engage (e.g. axially) the housing mount 102. In such embodiments, the user holds the luminaire housing 104 to the housing mount 102 while rotating into position or orients before axial engagement before fixing the rotational orientation with the locking mechanism 70.

In some embodiments, the security light 100 also includes an interior alkaline battery compartment in case of power interruption. For example, as best shown in FIG. 5A, single or multiple batteries 160 may be provided within the luminaire housing 104, when at a predetermined and specified voltage or condition, to provide as a third power supply to the security light 100. The batteries 160 may be a standard alkaline battery or other power storage source, which are insertable into the luminaire housing 104 or kept in close proximity thereof for use when the junction box 3 and/or the solar charging station 114 have insufficient power to appropriately energize the security light 100 and/or other load factors. For example, when there is an outage of the utility power to the junction box 3 and the voltage level of the rechargeable battery 120 in the solar charging station 114 is determined to be too low, the security light 100 may operate using the battery 160. The first lamp head 112A and the second lamp head 112B may operate independently (e.g., only one lamp head may be activated) when powered by the battery 160 to reduce energy consumption and further extend the life of the battery 160.

In some embodiments, there may be a secondary and separate backup power compartment, in addition to the batteries 160, operably connected to critical electrical components of the security light 100. For example, as shown in FIG. 6, a power storage device or battery 128 may be held in a cavity of the base portion of the housing mount 102, and the controller 200 and communication electronics may be powered by such an alternative electrical supply for minimal communication purposes with a user device or for other critical operations.

The motion sensor 110 may incorporate the use of multiple or single mounted passive infrared sensor (PIR), pyroelectric infrared radial (PR) sensor, radar, sonic and/or laser range finding, among various technologies known to electronically determine movement of people and/or animals. For example, in some embodiments, the motion sensor 110 may be a capacitive sensor that utilizes a heatsink of the security light 100 and/or a transparent patch of indium tin oxide (ITO) on an outer surface of security light 100 as a key. Also, for example, in some embodiments, the motion sensor 110 may be an ultra-sonic Doppler transmitter and receiver that uses time of flight techniques to determine distance to an object. Also, for example, in some embodiments, the motion sensor 110 may be a radar transmitter and receiver that uses time of flight techniques to determine distance to an object. Also, for example, in some embodiments, the motion sensor 110 may be an infra-red reflection distance sensor receiver that measures distance to an object. Also, for example, in some embodiments, the motion sensor 110 may be a PIR that detects a heat source (such as a user's hand). Also, for example, in some embodiments, the motion sensor 110 may be light reflection sensor that detects presence and/or distance of an object based on reflections of light output of the security light 100. Also, for example, in some embodiments, the motion sensor 110 may be a camera and one or more signals from the camera may be utilized to detect presence and/or distance of an object. For example, signals from a depth camera may be utilized to determine an object in the shape of a person or vehicle is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments a proximity sensor may include one or more controllers to determine presence, distance, and/or other values.

The motion sensor 110 may be affixed directly to the luminaire housing 104 or may be remote therefrom and may be connected to the security light 100 either by a wired or a wireless connection. For example, the motion sensor 110 may communicate with the security light 100 from a remote location and provide a signal indicating detected motion. Such technology may include heat signatures, range finding and/or distance measurement algorithms and other techniques which may be electronically implemented in the motion sensor 110, combined with electronics within the luminaire housing 104.

In some embodiments, the motion sensor 110 may also include a motion sensor lens 132 to protect electronics inside, and through which the motion sensor 110 can detect motion. The motion sensor lens 132 may be a transparent or translucent bulb type housing. For example, the motion sensor lens 132 may be a Fresnel lens and/or other similar structures to focus light and/or radiation to the opening allowing input to the senor electronics. In some embodiments, the motion sensor 110 may also be supported by, and at least partially housed within an adjustable sensor shroud 124. In such embodiments, the adjustable sensor shroud 124 may be used to cover the lens 132 of the motion sensor 110 to focalize incoming radiation as needed. The adjustable sensor shroud 124 may automatically adjust (e.g., by gravity) in various configurations to position properly for the operation of the motion sensor 110. It should be understood that although the motion sensor 110 shown here is in an orbicular sphere configuration, other configurations (e.g., a flat motion sensor 110) may also be acceptable.

Figure 8:
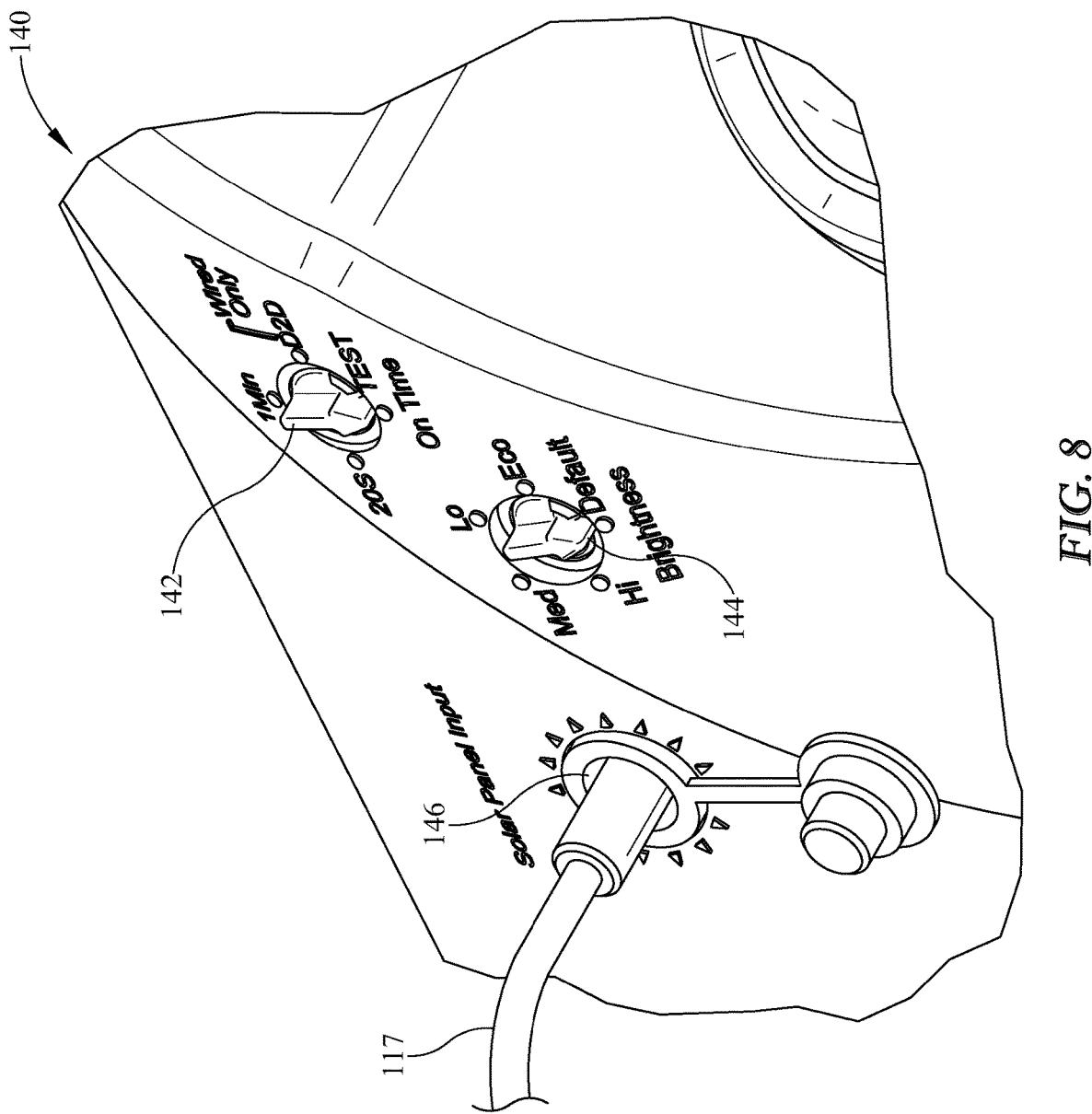
FIG. 8 is an enlarged side perspective view of a control panel user input of FIG. 7, according to an embodiment of the present disclosure.

Besides the motion sensor 110, in some embodiments, the security light 100 may incorporate additional sensing devices such as a light (optical) sensor to determine ambient light levels, allowing the associated lamp head 112 to come on at dusk (e.g., enabling the dusk to dawn (D2D) mode as shown in FIG. 8). For example, a light sensor such as a photodiode with fully operational light sensing electronics may be located on the luminaire housing 104. The light sensor may also be combined with other location finding techniques to determine location and time zone and correlating location with pre-determined or calculated sunset and sunrise times. For example, upon access to an internet connection, a wireless communication module 202 could obtain location information and also automatic sunset and sunrise information daily for such location. Alternatively, the lighting controller may have associated electronics and memory to allow programming of customer/installed desired on/off times after dusk, illumination ON times after sensing motion, full dusk to dawn illumination, partial or lower light intensity dusk to dawn illumination for the entire period or for user defined periods, modification of intensity levels, or other customer desirable modifications. Further, the lighting controller may further be configured to sense a hard 'reset' or active 'on' by manual switching off then on of the power at the switch by the user. All of such features may be incorporated into the lighting controller programming where a microprocessor executes instructions stored in an associated memory, or in alternative or combined configurations, some or all features may be implemented with associated circuit controls incorporated into the controller. The light sensor may be a photocell, such as a light dependent resistor or photo resistor or a photocell, however other types of light sensors may also be used.

It should be understood that duty cycle modification, frequency modulation, or other modulation schemes and control functions may be utilized in such embodiments for purposes of modifying the intensity level of the illumination and pulse width modulation to save energy. Further, other power usage functionality may be implemented such as reducing the modulation frequency of the lamp head 112 once certain voltage levels are reached, modifying the light output or other characteristics, reading ambient temperature characteristics to modify charging cycles and the like.

In some embodiments, it may be desirable to allow the user to reprogram the associated control parameters of the security light 100. Such modification can include the delay times and sensitivity for triggering of the motion sensor 110, the light intensity levels, color, color temperature, and color sensitivity for triggering of the light sensor, as well as other control parameters such as on times and lower illumination times and/or levels. Such reprograming may be implemented through the security light 100 user input switches or dials as well as through wireless communications.

As shown in FIG. 8, a control panel 140 for the security light 100 may be located on the luminaire housing 104 and allow for a first and a second user input. In some embodiments, the control panel 140 may be located elsewhere on the security light 100, or the control panel 140 may be located remotely from the security light 100. The control panel 140 may include a variety of controls to allow a user to make adjustments to the operation of the security light 100. In the illustrated embodiment as shown only as one example in FIG. 8, the control panel 140 may include a timer adjustment 142, a brightness adjuster 144, and/or a solar panel connection port 146. The timer adjustment 142 allows a user to adjust how long the lamp head 112 should remain illuminated once motion has been detected by the motion sensor 110. The brightness adjustment 146 user input allows a user to adjust the light level of the one or more lamp head 112. The test mode may allow a user to walk around and adjust the motion sensor 110 to the desired position. The D2D mode places the security light 100 in an "ON" state from sundown to sunrise. It should be understood that alternative control panel layouts, configurations, and controls are possible. For example, in some embodiments, the security light 100 may have one or more color-changing lamp heads 112, and the control panel 140 may also include controls for allowing a user to set the color of light being emitted. In some other embodiments, user specified alternative modifications may further include flashing or blinking lights of each or all lamp heads 112 under predefined conditions. For example, in some embodiments, one or more lamp heads 112 may be programmed via the control panel 140 to flash intermittently to indicate an alert or warning condition, such as the detected interruption of power. Alternatively, a flashing alert or warning condition may be implemented by programming or user adjustment of controls by one or more light panels upon detection of motion while concurrently increasing illumination intensity of one or more lamp heads 112.

It should be also understood that such reprogramming capability may also be readily implemented by a user through a mobile programming device, such as a phone or dedicated remote control, and a communication channel may be utilized for both transmission and receiving commands from the remote source or server or directly from the user device. Corresponding applications may be implemented for modification of such features on a user mobile device. For example, a user may select and/or modify ON time after the motion sensor 110 detects motion while also selecting the illumination intensity, such as dimming the illumination levels slowly during change in state. In alternative embodiments, the user may select and/or modify the specific colors utilized by the lamp head 112, if supported, and may include user modification of the color temperature. Such modifications may be implemented either for of each or all lamp heads 112.

As stated previously, in some embodiments, the security light 100 may include one or more electrical components such as the controller 200, transformers, and other electronics. For example, in some embodiments, various electronics such as wireless communication modules 202 allow remote control of the security light. In such examples, a Wi-Fi, blue tooth, ZigBee, or other short-range communication protocols may be implemented with supporting electronics as part of a wireless communication strategy. Modification of light output characteristics may be implemented by modulation techniques including pulse width modulation, frequency modulation, amplitude modulation, embedded pulse code modulation for data inclusion, as well as others and combinations thereof. The controller and/or driver for the security light 100 may be integrated into a single electronic circuit and/or control processor are not necessarily required to be separated or integrated as either may be implemented, alone or in a combined configuration to control the light output of the lamp head 112. The respective modulated pulses from the driver, drivers, and/or controllers as well as possibly the baseline currents output by the driver circuits may be independently controlled by higher level logic of a system controller. In a digital controller example, such logic may be implemented by a programmable microcontroller, although those skilled in the art will recognize that the logic could take other forms, such as discrete logic components, an application specific integrated circuit (ASIC), etc. Additionally, and/or alternatively, the security light 100 may be configured to operate at pre-programmed or pre-scheduled times.

In some embodiments, the security light 100 may also include a wireless communication module 202. The communication module may allow communication with other devices (e.g., a Wi-Fi router) to establish a wired or a wireless connection according to various communication standards (e.g., Ethernet, Wi-Fi, Bluetooth, or ZigBee) between the security light 100 and a remote device (e.g., a smart phone, server, etc.). In some embodiments, the communication module may be located in the luminaire housing 104 and/or the housing mount 102. In some embodiments, the communication module may be in a separate location from the security light 100. For example, the communication module may be located remotely connected by wire or wirelessly to the security light 100 and other electronics. The communication module may be, for example, a Wi-Fi microchip with full TCP/IP stack and microcontroller capability. The communication module may allow the controller 200 embedded to connect to the internet and make simple TCP/IP connections using Hayes-style commands. The communication module may also allow the security light 100 to transmit data through the internet to various servers or other devices.

In various embodiments, the communication module and the controller 200 may be integrated. For example, the controller 200 may be provided with processing capabilities and also include an embedded wireless controller chip. In still further examples, multiple electronic elements may be integrated or separated. For example, a lighting controller may be integrated with communications module into a single chip.

It should be understood that various control functions may be achieved with the help of the communication module. For example, a user may use a smart phone to communicate to the security light 100 using the communication module to select and/or modify ON time after the motion sensor 110 detects motion while also selecting the illumination intensity, such as dimming the illumination levels slowly during change in state. In alternative embodiments, the user may use the smart phone to communicate to the security light 100 using the communication module to select and/or modify the specific colors utilized by the associated light fixtures, if supported, may also select and/or modify the color temperature.

In some embodiments, the security light 100 may include a variety of water proofing features to reduce the flow of water into the light fixture and/or internally between structures of the components. Weather proofing and water proofing between the luminaire housing 104 and the housing mount 102 may prevent moisture intrusion into the electrical connectivity and interface area providing electrical connection and power to the light fixture. Moisture intrusion into such areas could potentially cause corrosion or other issues related to the exposed electrical connecting structures. Various water prevention structures can be implemented in the interface areas between the two structures. For example, one or more seals or gaskets 80 may be used between the luminaire housing 104 and the housing mount 102. As shown in FIG. 5A, one or more gaskets or O-rings 80 may be positioned between the luminaire housing 104 and the housing mount 102. The gasket 80 may be outside the periphery of the rear mounting plane 139 of the first portion 106 between the luminaire housing 104 and the housing mount 102 to reduce water from entering towards the electrical coupling. The gasket 80 is shown attached to the luminaire housing 104, however the gasket 80 may be coupled to the housing mount 102 in some embodiments. Internally within the luminaire housing 104 and/or the housing mount 102 may be one or more gaskets 80 as well. For example, two O-rings 80 may be used within the housing mount 102 to seal the electrical components within one or more internal compartments. Further, screws or other fasteners may also include gaskets to seal their corresponding openings.

Turning to FIG. 9, an exemplary electronic configuration is shown supporting three variant electrical supply inputs. The disclosure of FIG. 9 is provided for exemplary purposes only as many different configurations of supporting electronics and control systems may be utilized to effectuate similar features.

As shown, the outdoor security light 100 may have an internal microprocessor/MCU 200 which acts as the illumination or lighting controller. The controller 200 in this example can receive as input multiple voltages or other input signals which provide information as to the status of the connected power supplies as well as user preferences, stored instructions and communication electronics. For example, the controller 200 can sense the status as an electrical characteristic the connected first electrical supply input 201, second electrical supply input 203 and third electrical supply input 205. In some examples, the first electrical supply input could be an electrical connection to the power cables at the junction box to which the mounting plate or housing mount is mechanically and electrically connected. The electrical characteristic may be evaluated prior to or after modification within the housing mount and conversion of the electrical supply to a low voltage DC supply. Alternatively, for example, the electrical characteristic may be taken after voltage regulation and at a sampling point where the low voltage DC electricity is provided to the luminaire housing.

In other examples, the second electrical supply input 203 may be a remote solar charging station may include a rechargeable battery which is connected to a connection portal on the luminaire housing. In still further examples, the rechargeable battery of the remote solar charging station may be positioned on-board of the luminaire housing or intermediate thereof. In some implementations, the remote solar charging station may be integrated into the structure to which the security light is attached or may be integrated into the security light housing 104. As installed however it may be preferable to have the photovoltaic cells in direct light separate from shadows or other obstructions. Positioning the cell on a roof or other stand-alone area may provide increased charging characteristics for the rechargeable battery of the remote solar charging system. Alternative constructions may be implemented. For example, a photovoltaic power cell may be integrated into the housing of the security light 100 or into a wall mounted power cell nearby. However, as depicted in FIGS. 1A, 1B, 4 and 7, a remote solar charging station is provided having a photovoltaic cell which charges a rechargeable battery in the base of the station. The station is connected by wire or other electrical connection to the luminaire housing to provide an additional source of electrical supply input.

In still further examples, the third electrical supply input 205 may be a battery pack internal to the luminaire housing 104 such as, for example, one or more alkaline batteries. The third electrical supply input may be provided as a power source of last resort, wherein the electrical supply at the junction box has been disconnected or is not available, the rechargeable battery of the solar charging station is depleted or below a nominal voltage or other value. The third electrical supply input is depicted in FIG. 5A as a plurality of batteries stored within the luminaire housing. However, the battery pack can be a singular battery or a remote storage facility. In implementations, the alkaline battery back may act as a backup battery supply when all other electrical supply options fail.

In each instance, the controller 200 may have a preferential or default lighting output characteristic depending on which electrical supply input is connected to the load of LEDs 210. For example, when the controller switches connection to the junction box first electrical supply input, the output lighting characteristic may be to illuminate each of the connected lamp heads to a maximum output of 1000 lumens per lamp head. Alternatively, if the lighting controller 200 connects the load to the remote solar charging station supply, a default lighting characteristic may be to illuminate each lamp head at 750 lumens per lamp head. Finally, when the lighting controller 200 determines the internal alkaline batteries are connected to the LED load 210, the controller 200 may utilize a lighting characteristic of up to 500 lumens output per lamp head.

In other implementations and examples, the lighting output characteristic may be color based upon the LEDs that re connected to the load and the LED drivers 212. Other known modifications of the lighting characteristics may be made based upon the selected electrical supply input.

As depicted in FIG. 9, the lighting controller may receive multiple input signals including user input 1, 204, user input 2, 206 and wireless input 202. These user input selections may be entered from a dial, as shown in the example, or switch, slide or other selection device accessible to the user. Alternatively, user input may be received from a wireless transceiver 202 which receives user selections from a remote device, such as a smart phone or computer.

For example, user input interface may be provided on the outside of the luminaire housing such as dials 142, 144 shown in FIG. 8. As depicted, user preference is provided for a lighting output characteristic of brightness. Multiple modes may be selected by the user to either modify a default selection of a lighting output characteristic based upon selected electrical supply input. For example, a user selected input of HI may over-ride a default brightness and require all lamp heads be powered at a maximum level of 1000 lumens per lamp head, for example. Similar settings may be entered by the user for a Medium setting at 750 lumens per lamp head, Low at 500 lumens per lamp head, or an Economy mode, all of which over-ride the automatic selection of the lighting output characteristic.

Similarly, user input 2, 206 may include a dial accessible by the user which sets On Time timer values if motion is detected by the outdoor security light. Settings may variably include 20 seconds, 60 seconds or any desired amount. As well, if the security light is connected to a wired house/line voltage electrical connection a dusk to dawn illumination setting may also be provided.

While the term line voltage is utilized variously herein as a connected power supply for the security light, generally it reflects the desire to have a wired connection for a power supply from an external supply source. For example, a line voltage wired connection may be the electrical supply at the residence or building where the luminaire is installed. The wired connection may be through the junction box at a wired junction point of known house copper wiring carrying 120 VAC.

Lighting controller 200 receives various signal inputs and controls the output light of the LEDs 210. Other inputs may be received such as a photocell to detect ambient light, as well as a motion sensor such as a PIR, both of which may provide voltage or to her electrical signals to one of the inputs of the MCU 200.

Additional on-board memory 208 may also be incorporated into the control system containing instructions for implementing the various features and functions noted herein.

In operation and in some implementations, the lighting controller 200 may utilize a voltage detect signal at each of the first, second and third electrical supply inputs, 201, 203, 205. For example, a detection nodes at 215, 211 and 207 may provide signals to the controller indicating the viable connection and operability of each of the electrical supply input. For example, if a valid voltage signal is detected at the various nodes, the controller may select a priority electric supply input. For example, if a voltage is detected at each voltage detection node, the controller may automatically default to select electrical supply input 1, 201 which may represent a wired line voltage connection from the junction box. This detection node 215 may be positioned after voltage regulation of the electricity received from the junction box or prior to reduction of voltage to a low voltage supply at the mounting face of the housing mount.

In some implementations, voltages may be detected at each of the detection nodes 215, 211 and 207. Other electrical characters may also be detected at the nodes indicating that a viable electrical connection exists at the power supply input. For example, the detection node may sample current. Corresponding circuits may be utilized at each of the detection nodes to provide an appropriate signal to the MCU 200.

In operation, the controller 200 receives the electrical characteristics from the detection nodes 215, 211 and 207 and selects a power supply to connect to the load, namely the LEDs 210. For example, switches 217, 213 and 209 may be electrically connected to the controller 200 allowing the controller to connect the selected electrical supply input. For example, a MOSFET, latching relay, triac or other switch may be utilized to open and close selected power supply electrical connectivity to the load 210.

For example, a default priority list of selected electrical supply input may be wired connection/line voltage at electrical supply input 201 after sensing an appropriate signal at detection node 215. Switch 217 may be selected and activated while switches 213 and 209 may be kept open. Alternatively, if the detection node 215 fails to detected electrical connectivity of the power supply at electrical supply input 201, a default secondary supply 203 may be elected. Supply 203 may be the solar charging station rechargeable battery, if connected. Alternatively, as a last resort, if no appropriate signal is detected at detection nodes 215, 211, the on-board alkaline batteries may be connected to the load.

In other examples, the default priority list may be modified by the user through user input 204/206 or through wireless input 202. For example, a user may elect to continually use the rechargeable battery in the solar charging station 203 and switch to a wired connection 201 once the sensed electrical characteristic at 211 falls below a predetermined value. For example, in some implementations, the controller may receive input to select the solar charging station as the first priority electrical supply input and continually monitor the battery life. In some implementations, upon reaching a predetermined battery level, the controller may switch to a secondary priority electrical supply input. In each instance, the user may also select an associated lighting characteristic to be associated with the priority electrical supply input list. For example, a user supplied input may elect a predefined lighting characteristic be utilized only when the wired electrical supply input is selected thereby signaling that the rechargeable battery for the solar charging station has been depleted.

In each example, a default lighting characteristic may also be associated with the selected electrical supply input in the system memory 208 along with the user selected priority electrical supply input list. Lighting characteristics may be modified by signals sent by the controller 200 to the LED driver 212 or through utilization of other known techniques. For example, when the lighting characteristic is brightness, various modulation techniques may be utilized by the LED driver 212, such as frequency or amplitude modulation. Other known methods may be used for modification of the output light characteristics including alternative chips, circuits and combined controller/emitters used at the emitter.

Other lighting characteristics may be modified, such as color temperature. Color changing drivers may be utilized by the system to control the light output. These systems may use LED drivers that allow for independent control of the color temperature as well as the light output. Light output modification may be controlled by signals sent by the controller 200, LED driver 212 or combined emitter/driver chips. These are typically implemented utilizing multiple color LEDs which are each driven to match appropriate color output requirements. This can include modulation of the driving signals for each supported color emitter to match desired output characteristics.

While FIG. 9 depicts an exemplary configuration of a controller and circuit connection for the outdoor security light described herein, many modifications and alternative circuits and components may be utilized. For example, dedicated application specific integrated circuits may be customized for particular use in receiving various input signals and providing necessary output signals for driver control, load control and also control and selection of a power supply for the luminaire.

It is to be understood that a rotationally adjustable outdoor security light disclosed here is not limited in its application to the details of construction and the arrangement of components set forth in the following description or illustrated in the drawings. The described embodiments are capable of other embodiments and of being practiced or of being carried out in various ways. That is, the structure of the rotationally adjustable outdoor security light as shown here is presented for purpose of illustration and description only. It is understood that numerous modifications and alterations of the structure of the rotationally adjustable outdoor security light may be made while retaining the teachings of the present disclosure. Consequently, the disclosed rotationally adjustable outdoor security light may be installed in various environments. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings. It should be understood that the rotationally adjustable mechanism could vary greatly and still accomplish the same intent. The elements depicted in the accompanying figures may include additional components and that some of the components described in those figures may be removed and/or modified without departing from scopes of the elements disclosed herein. The elements depicted in the figures may not be drawn to scale and thus, the elements may have different sizes and/or configurations other than as shown in the figures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A rotationally adjustable outdoor security light for wall or eaves mount, comprising:
    a housing mount affixable to a surface of a structure;
    a luminaire housing, the luminaire housing having:
        a luminaire housing first portion removably attachable to the housing mount;
        a luminaire housing second portion rotatable relative to the luminaire housing first portion;
    the luminaire housing second portion having a motion sensor and at least one lamp head, the at least one lamp head including at least a first lamp head, the at least first lamp head positionally adjustable relative to the luminaire housing second portion.

2. The security light of claim 1 wherein the luminaire housing first portion is rotatable relative to the housing mount.

3. The security light of claim 2 wherein the luminaire housing second portion rotates along an angled rotational surface of the luminaire housing first portion.

4. The security light of claim 3 wherein the angled rotational surface is angled relative to a rear mounting plane of the luminaire housing first portion.

5. The security light of claim 2 wherein the luminaire housing first portion is electrically connected to the housing mount.

6. The security light of claim 5 wherein the luminaire housing first portion has at least one electrical contact rotationally engaging at least one electrical contact on the housing mount.

7. The security light of claim 1 wherein the housing mount has a receiving collar removably receiving the luminaire housing first portion.

8. The security light of claim 7 further including a locking mechanism restraining the luminaire housing first portion in the receiving collar.

9. The security light of claim 7 wherein the receiving collar of the housing mount surrounds a housing mount receiving plate.

10. The security light of claim 9 wherein the housing mount receiving plate has a first and a second rotational electrical contact.

11. The security light of claim 10 wherein the first and the second rotational electrical contact of the housing mount receiving plate are a first and a second concentric electrical contact ring.

12. The security light of claim 10 wherein the luminaire housing first portion has a first and a second rearwardly projecting electrical contact aligned with the first and the second rotational electrical contact of the housing mount receiving plate.

13. The security light of claim 1 wherein the first and second lamp head each rotationally attached to the luminaire housing second portion by a respective first and second rotational hinge.

14. The security light of claim 13, wherein each respective rotational hinge rotate about a first and a second axis.

15. The security light of claim 14 wherein the first and second axis are orthogonal.

16. The security light of claim 1 wherein the motion sensor is mounted on the luminaire housing second portion independent of the at least one lamp head.

17. The security light of claim 16 wherein the motion sensor includes an adjustable sensor shroud.

18. The security light of claim 17 wherein the adjustable sensor shroud adjustably covers a lens of the motion sensor.

19. The security light of claim 1 wherein the luminaire housing second portion is rotatable relative to the luminaire housing first portion at least 180 degrees.

20. A rotationally adjustable outdoor security light for wall or eaves mount, comprising:

a housing mount removably receiving a luminaire housing;

the luminaire housing including a luminaire housing first portion and a luminaire housing second portion, the luminaire housing first portion removably attached to the housing mount;

the luminaire housing in electrical contact with the housing mount;

the luminaire housing second portion rotational relative to the luminaire housing first portion;

the luminaire housing having at least one lamp head adjustably mounted to the luminaire housing and also having an adjustable sensor, the at least one lamp head including at least a first lamp head and at least a second lamp head, the at least first lamp head and the at least second lamp head positionally adjustable relative to the luminaire housing second portion.

21. A rotationally adjustable outdoor security light for wall or eaves mount, comprising:

a housing mount affixable to a wall or an eaves, the housing mount having a plurality of engageable electrical contacts;

a luminaire housing removably attachable to the housing mount, the luminaire housing having a plurality of luminaire electrical contacts respectively engaging the plurality of engageable electrical contacts of the housing mount;

the luminaire housing having a first portion and a second portion, the second portion rotationally connected to the first portion and rotatable by about 180 degrees on the first portion;

the luminaire housing second portion having at least one adjustably connected one lamp head and having an adjustable motion sensor;

the housing mount having a receiving collar, the receiving collar removably receiving the luminaire housing first portion and having a locking mechanism to restrain the luminaire housing to the housing mount;

wherein the luminaire housing is removably receivable within the housing mount and maintains electrical connectivity to the at least one lamp head during rotation of the first portion of the luminaire housing relative to the second portion of the luminaire housing.

* * * * *